(12) United States Patent
Kuhara

(10) Patent No.: US 10,399,675 B2
(45) Date of Patent: Sep. 3, 2019

(54) UNMANNED AIR VEHICLE AND FLIGHT CONTROL METHOD

(71) Applicant: Panasonic Intellectual Property Corporation of America, Torrance, CA (US)

(72) Inventor: Shunsuke Kuhara, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/264,896

(22) Filed: Sep. 14, 2016

(65) Prior Publication Data

US 2017/0106976 A1    Apr. 20, 2017

(30) Foreign Application Priority Data

Oct. 14, 2015   (JP) ................................ 2015-202725
Feb. 17, 2016   (JP) ................................ 2016-027761
May 27, 2016   (JP) ................................ 2016-106590

(51) Int. Cl.
| | | |
|---|---|---|
| *B64C 39/02* | (2006.01) | |
| *G05D 1/10* | (2006.01) | |
| *G08G 5/04* | (2006.01) | |
| *G06K 9/00* | (2006.01) | |
| *G08G 5/00* | (2006.01) | |

(52) U.S. Cl.
CPC ........... *B64C 39/024* (2013.01); *G05D 1/105* (2013.01); *G06K 9/0063* (2013.01); *G06K 9/00369* (2013.01); *G08G 5/0069* (2013.01); *G08G 5/045* (2013.01); *B64C 2201/027* (2013.01); *B64C 2201/141* (2013.01)

(58) Field of Classification Search
CPC ............ B64C 39/024; B64C 2201/027; B64C 2201/141; G08G 5/0069; G08G 5/045; G06K 9/0063; G06K 9/00369; G05D 1/105

See application file for complete search history.

(56) References Cited

U.S. PATENT DOCUMENTS

| | | | | |
|---|---|---|---|---|
| 2016/0214715 | A1* | 7/2016 | Meffert | B64C 39/024 |
| 2016/0253907 | A1* | 9/2016 | Taveira | G08G 5/006 |
| | | | | 701/3 |
| 2016/0364989 | A1* | 12/2016 | Speasl | G08G 5/0034 |
| 2017/0004714 | A1* | 1/2017 | Rhee | G08G 5/0082 |
| 2017/0045894 | A1* | 2/2017 | Canoy | G05D 1/101 |
| 2017/0053169 | A1* | 2/2017 | Cuban | H04N 7/185 |

FOREIGN PATENT DOCUMENTS

JP         2014-199548      10/2014

* cited by examiner

*Primary Examiner* — Rodney A Butler
(74) *Attorney, Agent, or Firm* — Greenblum & Bernstein, P.L.C.

(57) ABSTRACT

An unmanned air vehicle includes: a camera that takes an image in a vertical direction from the unmanned air vehicle; an image processor that indicates, on the image, a region in which the unmanned air vehicle is likely to crash and that detects an object of avoidance that is present in the region; a crash-avoidance flight controller that, in a case where the object of avoidance is detected, controls flight of the unmanned air vehicle so that the object of avoidance becomes undetectable in the region; and a crash probable region determiner that changes the region according to a result of the flight control.

20 Claims, 21 Drawing Sheets

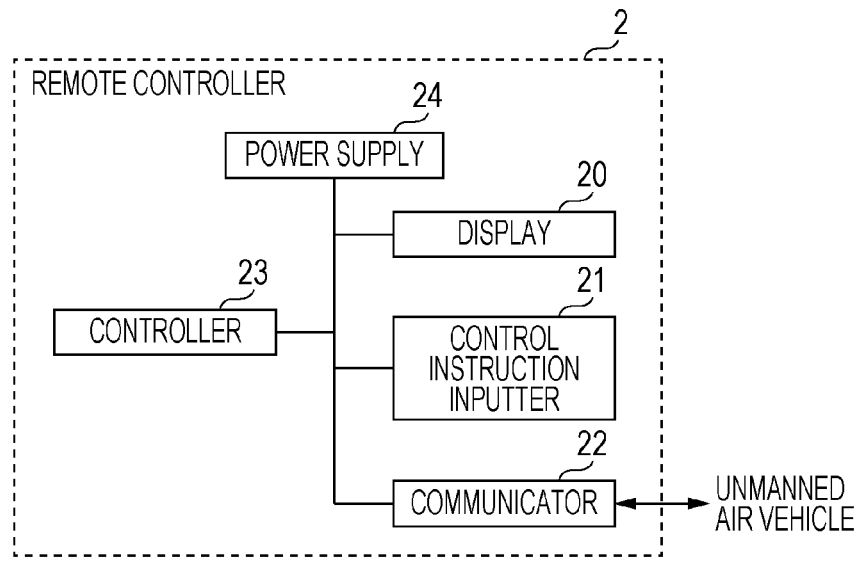

UNMANNED AIR VEHICLE AND FLIGHT CONTROL METHOD

BACKGROUND

1. Technical Field

The present disclosure relates to an unmanned air vehicle that flies without having a person inside it and a method for controlling flight of such an unmanned air vehicle.

2. Description of the Related Art

Conventionally, as a method for controlling flight of an unmanned air vehicle to prevent damage from a fall of the unmanned air vehicle, a technology for predicting a position of falling of the unmanned air vehicle, setting a no-fall region in which a fall of the unmanned air vehicle is prohibited, and setting, as a route of flight of the unmanned air vehicle, such a route that the predicted position of falling is outside of the no-fall region has been disclosed (see, for example, Japanese Unexamined Patent Application Publication No. 2014-199548).

Japanese Unexamined Patent Application Publication No. 2014-199548 sets the no-fall region in advance and sets the route of flight of an unmanned air vehicle so that the unmanned air vehicle does not fall into the no-fall region, thereby making it possible to reduce damage from a fall of the unmanned air vehicle due to unforeseen circumstances.

SUMMARY

However, the conventional technology has had difficulty in appropriately setting the no-fall region in advance in a case where an object of avoidance such as a person or a car moves, e.g. in the case of a person who is walking or a car that is moving.

One non-limiting and exemplary embodiment provides an unmanned air vehicle and a flight control method that make it possible to prevent an unmanned air vehicle from falling onto an object of avoidance and to fly an unmanned air vehicle efficiently.

In one general aspect, the techniques disclosed here feature an unmanned air vehicle including: a camera that takes an image in a vertical direction from the unmanned air vehicle; and circuitry which, in operation, indicates, on the image, a region in which the unmanned air vehicle is likely to crash; detects an object of avoidance that is present in the region; in a case where the object of avoidance is detected, controls flight of the unmanned air vehicle so that the object of avoidance becomes undetectable in the region; and changes the region according to a result of the flight control.

It should be noted that general or specific embodiments may be implemented as a system, a method, an integrated circuit, a computer program, a storage medium, or any selective combination thereof.

The present disclosure makes it possible to prevent an unmanned air vehicle from falling onto an object of avoidance and to fly an unmanned air vehicle efficiently.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a block diagram showing a functional configuration of a remote controller according to Embodiment 1 of the present disclosure;

FIG. 5 is a diagram showing an example of a crash probable region table stored in a memory according to Embodiment 1 of the present disclosure;

DETAILED DESCRIPTION

Figure 1:
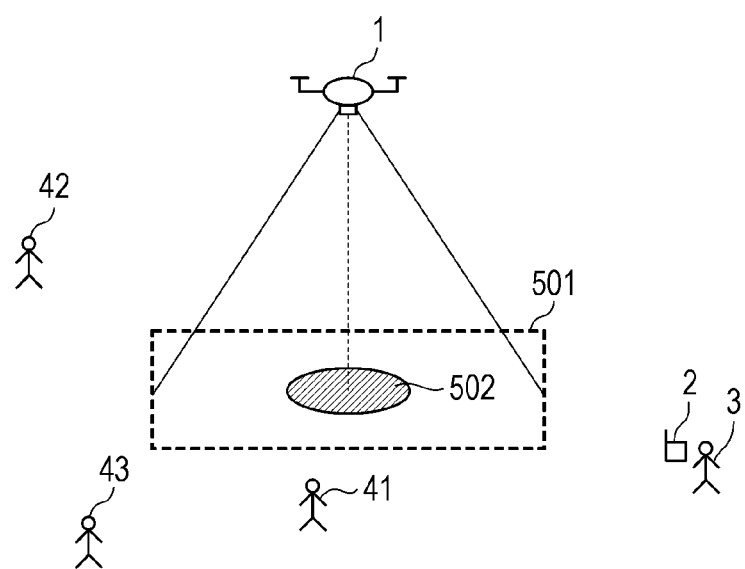
FIG. 1 is a conceptual diagram for explaining an operation of an unmanned air vehicle according to Embodiment 1 of the present disclosure.

Underlying Knowledge Forming Basis of the Present Disclosure

As described above, the conventional technology disclosed in Japanese Unexamined Patent Application Publication No. 2014-199548 predicts a position of falling of the unmanned air vehicle, sets a no-fall region in which a fall of the unmanned air vehicle is prohibited, and sets, as a route of flight of the unmanned air vehicle, such a route that the predicted position of falling is outside of the no-fall region.

However, the conventional technology has had difficulty in appropriately setting the no-fall region in advance in a case where an object of avoidance moves.

In order to solve such a problem, an unmanned air vehicle according to one aspect of the present disclosure includes: a camera that takes an image in a vertical direction from the unmanned air vehicle; and circuitry which, in operation, indicates, on the image, a region in which the unmanned air vehicle is likely to crash; detects an object of avoidance that is present in the region; in a case where the object of avoidance is detected, controls flight of the unmanned air vehicle so that the object of avoidance becomes undetectable in the region; and changes the region according to a result of the flight control.

According to this configuration, an image is taken in a vertical direction from the unmanned air vehicle. A region on which the unmanned air vehicle is likely to crash is superimposed onto the image. An object of avoidance that is present in the region thus superimposed is detected. In a case where the object of avoidance has been detected, flight of the unmanned air vehicle is controlled so that the object of avoidance becomes undetectable from the region. The region is changed according to a result of the control.

Therefore, since the flight of the unmanned air vehicle is controlled so that the object of avoidance becomes undetectable from the region on which the unmanned air vehicle is likely to crash, the unmanned air vehicle can be prevented from falling onto the object of avoidance. Further, since the region is changed according to the result of the control, the unmanned air vehicle can fly efficiently.

Further, the unmanned air vehicle may be configured to further include an altitude sensor that measures an altitude of the unmanned air vehicle, wherein the circuitry controls the flight of the unmanned air vehicle according to the altitude.

According to this configuration, the flight of the unmanned air vehicle is controlled according to the altitude of the unmanned air vehicle. Therefore, for example, changing the region so that the region becomes wider as the altitude of the unmanned air vehicle becomes higher makes it possible to surely prevent the unmanned air vehicle from falling onto the object of avoidance. Further, for example, changing the region so that the region becomes narrower as the altitude of the unmanned air vehicle becomes lower makes it possible to fly the unmanned air vehicle more efficiently.

Further, the unmanned air vehicle may be configured such that the circuitry makes the region narrower as the altitude of the unmanned air vehicle is lower.

According to this configuration, the region becomes narrower as the altitude of the unmanned air vehicle becomes lower. Therefore, a decrease in altitude of the unmanned air vehicle can cause no object of avoidance to be present in the region.

Further, the unmanned air vehicle may be configured such that the circuitry further detects at least one object of avoidance that is present outside of the region, that in a case where a number of objects of avoidance that are present outside of the region is larger than a predetermined number, the circuitry controls the flight of the unmanned air vehicle to lower the altitude of the unmanned air vehicle, and that the circuitry makes the region narrower as the altitude of the unmanned air vehicle becomes lower.

According to this configuration, an object(s) of avoidance that is/are present outside of the region is/are detected. In a case where the number of objects of avoidance detected is larger than a predetermined number, the flight of the unmanned air vehicle is controlled so that the altitude of the unmanned air vehicle becomes lower. The region becomes narrower as the altitude of the unmanned air vehicle becomes lower.

Therefore, by lowering the altitude of the unmanned air vehicle in advance and narrowing the region in a case where a larger number of objects of avoidance than the predetermined number are present outside of the region, the unmanned air vehicle can be prevented from falling onto the objects of avoidance.

Further, the unmanned air vehicle may be configured to further include a wind speed sensor that measures a speed of a wind around the unmanned air vehicle, wherein the circuitry controls the flight of the unmanned air vehicle according to the speed of the wind.

According to this configuration, the flight of the unmanned air vehicle is controlled according to the speed of the wind around the unmanned air vehicle. This makes it possible to appropriately change the range of the region according to the strength of the wind around the unmanned air vehicle.

Further, the unmanned air vehicle may be configured to further include a wind direction sensor that measures a direction of the wind around the unmanned air vehicle, wherein the circuitry controls the flight of the unmanned air vehicle according to the direction of the wind and the speed of the wind.

According to this configuration, the flight of the unmanned air vehicle is controlled according to the direction and speed of the wind around the unmanned air vehicle. This makes it possible to appropriately change the position and range of the region according to the direction and strength of the wind around the unmanned air vehicle.

Further, the unmanned air vehicle may be configured to further include: a speed sensor that measures a flight speed of the unmanned air vehicle; a position measurer that measures a current position of the unmanned air vehicle; and an azimuth sensor that measures an azimuth of the current position of the unmanned air vehicle, wherein the circuitry controls the flight of unmanned air vehicle according to the flight speed, the current position, and the azimuth.

According to this configuration, the flight of unmanned air vehicle is controlled according to the flight speed of the unmanned air vehicle, the current position of the unmanned air vehicle, and the azimuth of the current position of the unmanned air vehicle. This makes it possible to appropriately change the range of the region in the direction that the unmanned air vehicle travels.

Further, the unmanned air vehicle may be configured such that the circuitry further detects whether a second object is present in the region, the second object satisfying a preset condition, and that in a case where the second object is detected in the region, the circuitry does not control the flight of the unmanned air vehicle.

According to this configuration, in a case where the object of avoidance has been detected, it is determined whether the object of avoidance detected in the region satisfies a preset condition. In a case where it has been determined that the object of avoidance detected in the region satisfies the preset condition, the flight of the unmanned air vehicle is not controlled.

Therefore, for example, in a case where the object of avoidance detected in the region is an operator of the unmanned air vehicle, flight control that causes the unmanned air vehicle to fly so that the operator becomes undetectable from the region is not performed. This makes it possible to fly the unmanned air vehicle in such a manner as not to interfere with the control of the unmanned air vehicle.

Further, the unmanned air vehicle may be configured to further include a communicator that communicates with a terminal that controls the unmanned air vehicle, wherein in the case where the object of avoidance is detected, the communicator inquires of the terminal whether to control the flight of the unmanned air vehicle, and the circuitry controls the flight of the unmanned air vehicle in response to receiving a confirmation of the inquiry.

According to this configuration, the communicator communicates with the terminal that controls the unmanned air vehicle. In a case where the object of avoidance has been detected, the terminal is inquired of whether to control the flight of the unmanned air vehicle. Then, it is determined, according to a result of response to the inquiry, whether to control the flight of the unmanned air vehicle.

Therefore, the operator who controls the unmanned air vehicle is inquired of whether to perform flight control that causes the unmanned air vehicle to fly so that the object of avoidance becomes undetectable from the region. This allows the operator to intentionally determine whether to perform flight control.

Further, the unmanned air vehicle may be configured such that the circuitry superimposes the region in which the unmanned air vehicle is likely to crash on the image.

Further, the unmanned air vehicle may be configured such that the circuitry determines the region in which the unmanned air vehicle is likely to crash by accounting for a sudden failure of the unmanned air vehicle.

Further, the unmanned air vehicle may be configured such that the circuitry controls the flight of the unmanned air vehicle by dividing the image into a plurality of regions and causing the unmanned air vehicle to fly in a direction of one of the plurality of regions having a least number of objects of avoidance.

A flight control method according to another aspect of the present disclosure is a method for controlling flight of an unmanned air vehicle, including: taking an image in a vertical direction from the unmanned air vehicle; indicating, on the image, a region on which the unmanned air vehicle is likely to crash; detecting an object of avoidance that is present in the region; in a case where the object of avoidance is detected, controlling the flight of the unmanned air vehicle so that the object of avoidance becomes undetectable in the region; and changing the region according to a result of the controlling of the flight.

According to this configuration, an image is taken in a vertical direction from the unmanned air vehicle. A region on which the unmanned air vehicle is likely to crash is superimposed onto the image. An object of avoidance that is present in the region thus superimposed is detected. In a case where the object of avoidance has been detected, flight of the unmanned air vehicle is controlled so that the object of avoidance becomes undetectable from the region. The region is changed according to a result of the control.

Therefore, since the flight of the unmanned air vehicle is controlled so that the object of avoidance becomes undetectable from the region on which the unmanned air vehicle is likely to crash, the unmanned air vehicle can be prevented from falling onto the object of avoidance. Further, since the region is changed according to the result of the control, the unmanned air vehicle can fly efficiently.

Embodiments of the present disclosure are described below with reference to the drawings. In each of the embodiments, a case is described where an unmanned air vehicle flies near the sky over a plurality of persons walking on the ground.

Furthermore, in each of the embodiments, an operation for detecting a person from image information taken in a vertical direction from the unmanned air vehicle with a camera mounted on the unmanned air vehicle and moving the unmanned air vehicle toward a place where no person is present is described in detail with reference to the drawings.

Embodiment 1

FIG. 1 is a conceptual diagram for explaining an operation of an unmanned air vehicle 1 according to Embodiment 1 of the present disclosure.

In FIG. 1, an operator 3 remotely controls the unmanned air vehicle 1 with a remote controller 2. The operator 3 and a plurality of persons 41 to 43 are on the ground. In general, due to unforeseen circumstances such as failure, if any, during flight, an unmanned air vehicle usually falls into a circle of a predetermined radius centered at a point where the perpendicular intersects the ground. For this reason, the unmanned air vehicle 1 has a camera mounted on a lower part thereof to take an image of a place that is directly below the unmanned air vehicle 1. The camera mounted on the unmanned air vehicle 1 can take an image over a range of shooting 501, and the range of shooting 501 includes a range 502 on which the unmanned air vehicle 1 is likely to crash.

In Embodiment 1, the unmanned air vehicle 1 takes an image in a vertical direction from the unmanned air vehicle 1 with the camera mounted on the unmanned air vehicle 1. The unmanned air vehicle 1 superimposes, onto the image thus taken, a crash probable region indicating a region on which the unmanned air vehicle 1 is likely to crash. The unmanned air vehicle 1 detects a movable object of avoidance that is present in the crash probable region. In a case where the object of avoidance has been detected, the unmanned air vehicle controls its flight so that the object of avoidance becomes undetectable from the crash probable region. That is, upon detection of a person in the region 502 in the image taken by the camera, the flight of the unmanned air vehicle 1 is controlled so that no person is detected any longer in the region 502. This makes it possible to prevent the unmanned air vehicle 1 from falling onto a person even if the unmanned air vehicle 1 crashes due to unforeseen circumstances such as sudden failure.

It should be noted that the remote controller 2 may be a dedicated terminal for remotely controlling the unmanned air vehicle 1 or may for example be a mobile phone, a smartphone, a tablet computer, a laptop computer, or the like equipped with a function for remotely controlling the unmanned air vehicle 1.

Figure 2:
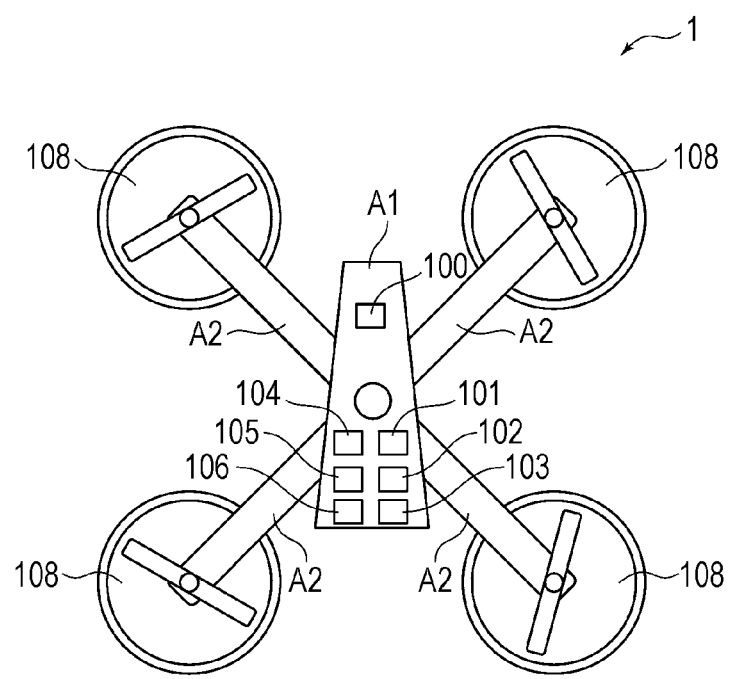
FIG. 2 is an appearance diagram of the unmanned air vehicle according to Embodiment 1 of the present disclosure.
Figure 3:
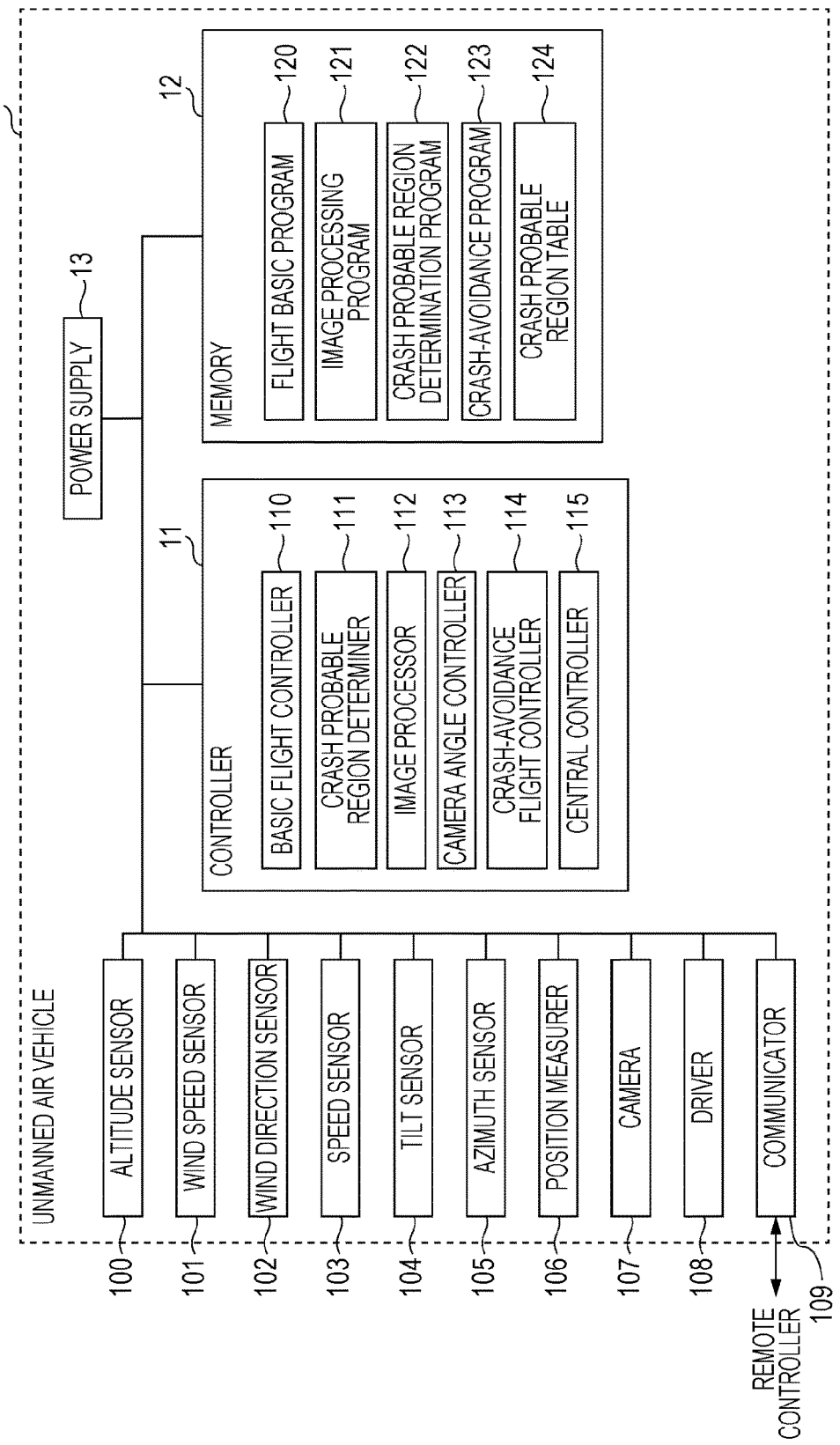
FIG. 3 is a block diagram showing a functional configuration of the unmanned air vehicle according to Embodiment 1 of the present disclosure.

FIG. 2 is an appearance diagram of the unmanned air vehicle 1 according to Embodiment 1 of the present disclosure. FIG. 3 is a block diagram showing a functional configuration of the unmanned air vehicle 1 according to Embodiment 1 of the present disclosure.

As shown in FIG. 2, the unmanned air vehicle 1 includes a main body A1 and drivers 108 that generate force that propels the unmanned air vehicle 1. The drivers 108 are attached to the ends of four supports A2 extending in four directions from the main body A1, respectively. An altitude sensor 100, a wind speed sensor 101, a wind direction sensor 102, a speed sensor 103, a tilt sensor 104, an azimuth sensor 105, and a position measurer 106 are attached to an upper side of the main body A1. Further, a camera 107 (not illustrated) is attached to a lower side of the main body A1. Furthermore, the drivers 108, a communicator 109, a controller 11, a memory 12, and a power supply 13 are housed in the body A1.

As shown in FIG. 3, the unmanned air vehicle 1 includes the altitude sensor 100, the wind speed sensor 101, the wind direction sensor 102, the speed sensor 103, the tilt sensor 104, the azimuth sensor 105, the position measurer 106, the camera 107, the drivers 108, the communicator 109, the controller 11, the memory 12, and the power supply 13.

The altitude sensor 100 is an altimeter such as a barometric altimeter or a radio altimeter. The altitude sensor 100 measures the altitude of the unmanned air vehicle 1.

The wind speed sensor 101 is an anemometer such as a cup anemometer, a windmill anemometer, or a hot-wire anemometer. The wind speed sensor 101 measures the speed of the wind around the unmanned air vehicle 1.

The wind direction sensor 102 is an anemoscope such as a vane anemoscope, an anemoscope integrated with a windmill anemometer, or an anemoscope put side by side with a cup anemometer. The wind direction sensor 102 measures the direction of the wind around the unmanned air vehicle 1.

It should be noted that although, in Embodiment 1, the unmanned air vehicle 1 measures the wind speed or the wind direction, the unmanned air vehicle 1 may alternatively use its communicator 109 to send positional information of the unmanned air vehicle 1 to an external device (not illustrated) such as a server and receive, from the external device (not illustrated) such as a server, information on the wind speed or the wind direction that corresponds to the positional information of the unmanned air vehicle 1. This configuration makes it possible to reduce the number of sensors that are mounted on the unmanned air vehicle 1, reduce the weight of the unmanned air vehicle 1, and drive down manufacturing cost.

The speed sensor 103 is for example an airspeed indicator. The speed sensor 103 measures the flight speed of the unmanned air vehicle 1.

The tilt sensor 104 is for example a gyro sensor or an acceleration sensor. The tilt sensor 104 measures the tilt of the unmanned air vehicle 1.

The azimuth sensor 105 is for example a geomagnetic sensor. The azimuth sensor 105 measures the azimuth of a flight direction that the unmanned air vehicle 1 is flying.

The position measurer 106 is for example a GPS (global positioning system). The position measurer 106 measures the position of the unmanned air vehicle 1. The position of the unmanned air vehicle 1 is expressed by longitude and latitude. It should be noted that in a case where the GPS is capable of measuring an altitude, the position measurer 106 may measure the altitude of the unmanned air vehicle 1.

The camera (imager) 107 is mounted, for example, on the lower surface of the unmanned air vehicle 1 to take an image in a vertical direction (direction of the force of gravity) from the unmanned air vehicle 1. The camera 107 does not need to be configured as described above, provided it can take an image in a vertical direction from the unmanned air vehicle 1.

The drivers 108 are for example motors or propellers. The drivers 108 perform a flight operation of the unmanned air vehicle 1 by operating under control of the controller 11. The unmanned air vehicle 1 includes a plurality of propellers and moves forward, backward, leftward, rightward, upward, and downward by controlling the number of revolutions of each of the propellers.

The communicator 109 receives information such as control instructions from the remote controller 2 and sends information on the unmanned air vehicle 1 to the remote controller 2.

The controller 11 is for example a CPU (central processing unit). The controller 11 controls operation of the unmanned air vehicle 1. The controller 11 includes a basic flight controller 110, a crash probable region determiner 111, an image processor 112, a camera angle controller 113, a crash-avoidance flight controller 114, and a central controller 115.

The basic flight controller 110 controls the flight of the unmanned air vehicle 1 in accordance with a flight basic program 120 stored in the memory 120 and control instructions received from the remote controller 2.

The crash probable region determiner 111 uses the results of sensing by the altitude sensor 100, wind speed sensor 101, wind direction sensor 102, speed sensor 103, tilt sensor 104, and azimuth sensor 105 of the unmanned air vehicle 1 to determine a crash probable region 52 with reference to a crash probable region determination program 122 stored in the memory 12 and a crash probable region table 124 stored in the memory 12. Details of the determination of the crash probable region 52 will be described later.

In accordance with an image processing program 121 stored in the memory 12, the image processor 112 superimposes a crash probable region onto an image taken in a vertical direction from the unmanned air vehicle 1 and detects, through image recognition, the presence of a person in the crash probable region thus superimposed. The image processor 112 superimposes, onto an image taken by the camera 107, a crash probable region indicating a region on which the unmanned air vehicle 1 is likely to crash. Further, the image processor 112 detects the presence of a person in the crash probable region thus superimposed. Note here that the person is an example of an object of avoidance.

On the basis of a result of detection of the tilt of the unmanned air vehicle 1 by the tilt sensor 104, the camera angle controller 113 controls the angle of the camera 107 so that the camera 107 can take an image in a vertical direction from the unmanned air vehicle 1.

In a case where the image processor 112 has determined the presence of a person in the crash probable region superimposed on the image taken in the vertical direction from the unmanned air vehicle 1, the crash-avoidance flight controller 114 so controls the flight of the unmanned air vehicle 1 in accordance with a crash-avoidance program 123 stored in the memory 12 that no person is present in the crash probable region. In a case where a person has been detected by the image processor 112, the crash-avoidance flight controller 114 controls the flight of the unmanned air vehicle 1 so that no person is detected any longer from the crash probable region.

Further, the crash probable region determiner 111 changes crash probable regions according to a result of the control of the flight of the unmanned air vehicle 1. It should be noted that the crash probable region determiner 111 changes crash probable regions according to a result of the control of the flight of the unmanned air vehicle 1 by the remote controller 2 or the crash-avoidance flight controller 114.

The central controller 115 controls overall operation of the unmanned air vehicle 1 other than the basic flight controller 110, the crash probable region determiner 111, the image processor 112, the camera angle controller 113, and the crash-avoidance flight controller 114.

The memory 12 stores the flight basic program 120, the image processing program 121, the crash probable region determination program 122, the crash-avoidance program 123, and the crash probable region table 124.

The flight basic program 120 is a program for performing a flight operation stored in advance in the unmanned air vehicle 1. Once the unmanned air vehicle 1 receives control instructions from the remote controller 2, a flight operation of the unmanned air vehicle 1 is performed in accordance with the flight basic program 120.

The image processing program 121 is a program for the image processor 112 to detect, through image recognition, the presence of a person in a crash probable region superimposed on an image taken in a vertical direction from the unmanned air vehicle 1.

The crash probable region determination program 122 is a program for the crash probable region determiner 111 to determine a crash probable region using the results of sensing by the altitude sensor 100, wind speed sensor 101, wind direction sensor 102, speed sensor 103, tilt sensor 104, and azimuth sensor 105 of the unmanned air vehicle 1.

The crash-avoidance program 123 is a program for, in a case where the image processor 112 has detected a person in a crash probable region, controlling the flight of the unmanned air vehicle 1 so that no person is detected any longer from the crash probable region.

The crash probable region table 124, stored in advance in the memory 12, is a table that indicates the area of a crash probable region as determined by the altitude and the wind speed. The crash probable region table 124 is referred to by the crash probable region determiner 111 in determining a crash probable region. The crash probable region table 124 stores the areas of crash probable regions in association with altitudes and wind speeds.

It should be noted that a crash probable region that is determined with reference to the crash probable region table 124 is determined so that the area of the crash probable region becomes larger as the altitude of the unmanned air vehicle becomes higher and becomes larger as the wind speed becomes higher.

At a higher altitude, the unmanned air vehicle 1 takes a longer time to crash, and accordingly, is affected by a wind effect for a longer time during a crash. Therefore, the crash probable region on the ground becomes larger as the altitude of the unmanned air vehicle 1 becomes higher. Further, the unmanned air vehicle 1 is more greatly affected by a wind effect during a crash. Therefore, the crash probable region on the ground becomes larger as the speed of the wind around the unmanned air vehicle 1 becomes higher.

The power supply 13 is for example a battery or a wired feeder. The power supply 13 supplies electric power to each of the constituent elements of the unmanned air vehicle 1.

FIG. 4 is a block diagram showing a functional configuration of the remote controller 2 according to Embodiment 1 of the present disclosure.

As shown in FIG. 2, the remote controller 2 includes a display 20, a control instruction inputter 21, a communicator 22, a controller 23, and a power supply 24.

The display 20 shows information to the operator 3 who is operating the remote controller 2. The control instruction inputter 21 is for example a button, a lever, or a touch panel. The control instruction inputter 21 receives an input of control instructions given to the unmanned air vehicle 1 by the operator 3. The communicator 22 sends, to the unmanned air vehicle 1, control instruction signals inputted by the operator 3 or the like, and receives information from the unmanned air vehicle 1.

The controller 23 is for example a CPU. The controller 23 controls operation of each of the constituent elements of the remote controller 2. The power supply 24 is for example a battery or a wired feeder. The power supply 23 supplies electric power to each of the constituent elements of the remote controller 2.

FIG. 5 is a diagram showing an example of the crash probable region table 124 stored in the memory 12 according to Embodiment 1 of the present disclosure.

The column of the crash probable region table 124 represents the altitude of the unmanned air vehicle 1, and the row of the crash probable region table 124 represents the speed of the wind around the unmanned air vehicle 1. Each value in the crash probable region table 124 represents a crash probable region corresponding to the altitude of the unmanned air vehicle 1 and the wind speed measured by the unmanned air vehicle 1.

In FIG. 5, in a case where the altitude of the unmanned air vehicle 1 exceeds 5 m, a crash probable region is determined according to the altitude and the wind speed, but in a case where the altitude falls within a range of 0 m to 5 m, the whole image is determined as a crash probable region. This is because, in a case where the altitude of the unmanned air vehicle 1 is low, an image can only be taken of a narrow range including a place that is directly below the unmanned air vehicle 1 and the whole image ends up being a crash probable region.

It should be noted that that although, in Embodiment 1, a crash probable region has a circular shape, a crash probable region may have another shape. For example, a crash probable region may have an elliptical shape whose major axis extends in the direction from which the wind is blowing.

Figure 6:
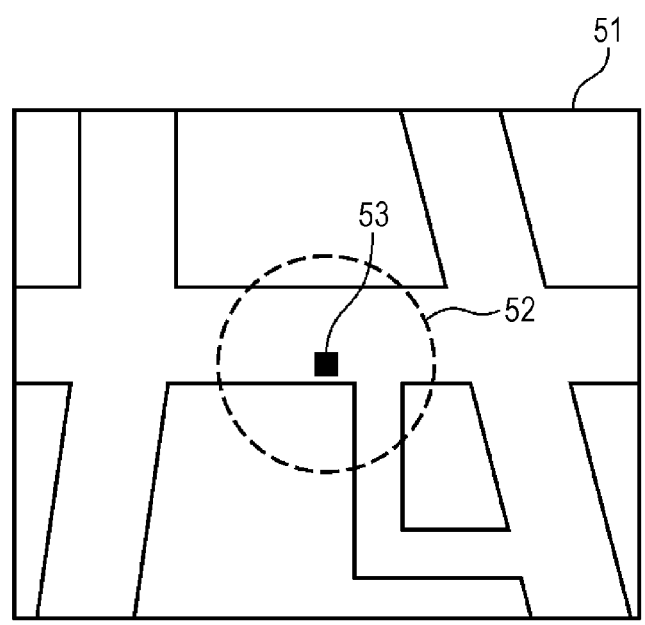
FIG. 6 is a diagram for explaining an example of superimposition of a crash probable region on an image taken in a vertical direction from the unmanned air vehicle according to Embodiment 1 of the present disclosure.

FIG. 6 is a diagram for explaining an example of superimposition of a crash probable region 52 on an image 51 taken in a vertical direction from the unmanned air vehicle 1 according to Embodiment 1 of the present disclosure. The center of the whole image 51 indicates a point 53 that is directly below the unmanned air vehicle 1 where a vertical line extending from the unmanned air vehicle 1 intersects the ground surface, and the crash probable region 52 is a region within a circle of a predetermined radius centered at the point 53. The image processor 112 superimposes, onto an image taken by the camera 107, an image representing a crash probable region indicating a region on which the unmanned air vehicle 1 is likely to crash.

The following describes a process by which the unmanned air vehicle 1 according to Embodiment 1 of the present disclosure takes an image in a vertical direction from the unmanned air vehicle 1 with the camera 107 mounted on the unmanned air vehicle 1, detects the presence of a person in the crash probable region 52 superimposed on the whole shot image 51, and, in a case where a person has been detected, moves itself so that no person is detected any longer in the crash probable region 52.

Figure 7:
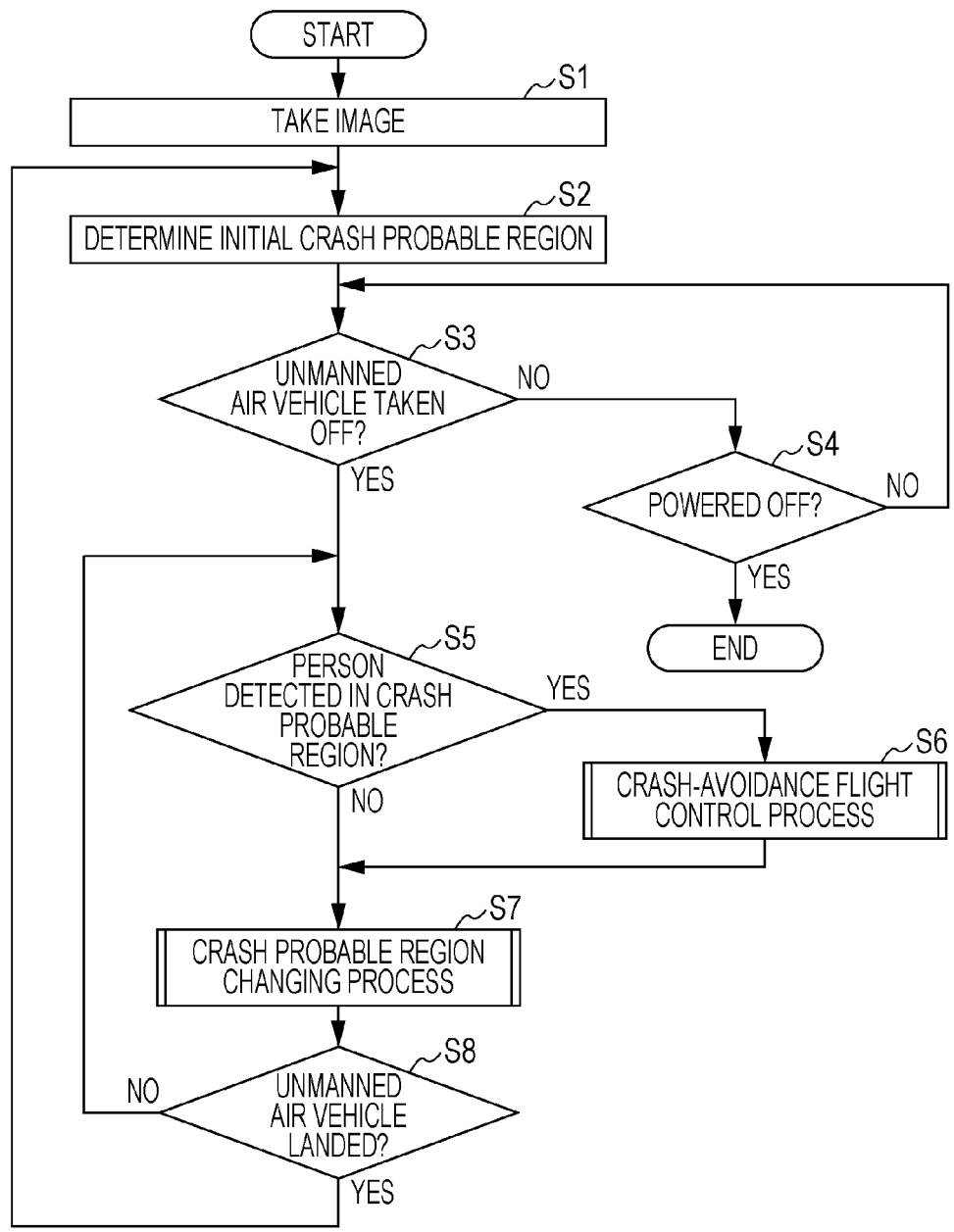
FIG. 7 is a flow chart for explaining a process of the unmanned air vehicle according to Embodiment 1 of the present disclosure.

FIG. 7 is a flow chart for explaining a process of the unmanned air vehicle 1 according to Embodiment 1 of the present disclosure. The following describes the flow of the process of the unmanned air vehicle 1.

Once the unmanned air vehicle 1 is activated by the operator 3, the process shown in FIG. 7 is started.

First, once the unmanned air vehicle 1 is activated, the central controller 115 activates the camera 107 to take an image in a vertical direction from the unmanned air vehicle 1 (step S1).

Once the central controller 115 starts to take an image with the camera 107, the crash probable region determiner 111 determines a crash probable region corresponding to an altitude of 0 m as an initial crash probable region with reference to the crash probable region table 124 stored in the memory 12 (step S2). In Embodiment 1, the crash probable region determiner 111 determines the whole image, which is a crash probable region corresponding to an altitude of 0 m, as an initial crash probable region with reference to FIG. 5.

Next, the central controller 115 determines whether the unmanned air vehicle 1 has taken off (step S3). In Embodiment 1, in a case where the communicator 109 of the unmanned air vehicle 1 receives control instructions from the remote controller 2 and the basic flight controller 110 has performed the first flight control process in accordance with the control instructions thus received, the central controller 115 determines that the unmanned air vehicle 1 has taken off.

The processes of steps S1 and S2 may be executed immediately before the unmanned air vehicle 1 performs the first flight control process in the process of step S3. This configuration makes it possible to reduce the supply of electric power to the camera 107 during a waiting time from the activation of the unmanned air vehicle 1 to the start of actual flight of the unmanned air vehicle 1, thus making it possible to cut battery drain.

In Embodiment 1, the processes from the point in time where the unmanned air vehicle 1 took off in the process of step S3 to the point in time where the unmanned air vehicle 1 lands in the process of step 8 (i.e. the processes of steps S5 to S7) are performed in parallel with the flight control process (not illustrated) of the unmanned air vehicle 1 in accordance with the control instructions from the remote controller 2. In other words, the after-mentioned processes of steps S5 to S7 are repeatedly performed during the flight operation of the unmanned air vehicle 1 in accordance with the control instructions from the remote controller 2.

Note here that in a case where the central controller 115 has determined that the unmanned air vehicle 1 has not taken off (NO in step S3), the central controller 115 determines whether the unmanned air vehicle 1 has been powered off (step S4). In a case where the central controller 115 has determined that the unmanned air vehicle 1 has not been powered off (NO in step S4), the process returns to step S3. In a case where the central controller 115 has determined that the unmanned air vehicle 1 has been powered off (YES in step S4), the process is ended.

On the other hand, in a case where the central controller 115 has determined that the unmanned air vehicle 1 has taken off (YES in step S3), the image processor 112 determines whether a person has been detected in the initial crash probable region 52 determined in step S2 (step S5). Specifically, in accordance with the image processing program 121 stored in the memory 12 of the unmanned air vehicle 1, the image processor 112 performs pattern matching to determine whether a person is present in the crash probable region 52.

The shot image to be processed in the process of step S5 is a shot image taken from the sky. Therefore, the image processor 112 performs pattern matching on the shot image with the head or face of a person to determine whether a person is present in the crash probable region 52. Note here that it is preferable that pattern data that is used in pattern matching be regularly updated from the external device such as a server for increased pattern matching accuracy. Communication with the external device such as a server may be performed via the remote controller 2 or by separately providing a communicator for communicating with the external device. Alternatively, the unmanned air vehicle 1 may be fitted with a detachable storage medium and read out pattern data stored in the storage medium.

It should be noted that it is conceivable that an increase in altitude of the unmanned air vehicle 1 causes the shot image to be an image taken from a place that is distant from the ground, thus making it difficult to detect a person. Therefore, the central controller 115 may cause the camera 107 to zoom in according to the altitude. This configuration makes it possible to detect the presence of a person by image processing with a high degree of accuracy even in a case where the altitude of the unmanned air vehicle 1 increases. Further, it is preferable that the central controller 115 control the focal length so that the crash probable region 52 is included in the shot image. This configuration makes it possible to prevent the crash probable region 52 from exceeding the shot image thus zoomed in, thus making it possible to detect the presence of a person in the crash probable region 52.

In a case where, in the process of step S5, the image processor 112 has determined that a person has been detected in the crash probable region 52 (YES in step S5), the crash-avoidance flight controller 114 performs a crash-avoidance flight control process for controlling the flight of the unmanned air vehicle 1 so that no person is detected any longer from the crash probable region 52 (step S6). In order to avoid a sudden crash of the unmanned air vehicle 1 on a person due to unforeseen circumstances such as failure, the crash-avoidance flight controller 114 moves the crash probable region 52 by controlling the flight of the unmanned air vehicle 1.

The process of step S6 is performed by the crash-avoidance flight controller 114 in accordance with the crash-avoidance program 123 stored in the memory 12. Details of the crash-avoidance flight control process of step S6 will be described later.

On the other hand, in a case where, in the process of step S5, the image processor 112 has determined that no person has been detected in the crash probable region 52 (NO in step S5) or in a case where the crash-avoidance flight control process of step S6 has been finished, the crash probable region determiner 111 performs, in accordance with the crash probable region determination program 122 stored in the memory 12, a crash probable region changing process for changing the crash probable region 52 (step S7). Details of the crash probable region changing process of step S7 will be described later.

Next, the central controller 115 determines whether the unmanned air vehicle 1 has landed (step S8). Specifically, in a case where the altitude of the unmanned air vehicle 1 as measured by the altitude sensor 100 of the unmanned air vehicle 1 has become 0 m, the central processor 115 determines that the unmanned air vehicle 1 has landed.

In a case where, in the process of step S8, the central controller 115 has determined that the unmanned air vehicle 1 has not landed (NO in step S8), the process returns to step S5, in which the process of step S5 is performed.

On the other hand, in a case where, in the process of step S8, the central controller 115 has determined that the unmanned air vehicle 1 has landed (YES in step S8), the process returns to step S2, in which the crash probable region determiner 111 determines the crash probable region 52 again as the initial crash probable region. This process is a process to prepare for the taking-off of the unmanned air vehicle 1, as it is conceivable that the unmanned air vehicle 1 may take off again after having landed. Then, in step S3, the central controller 115 determines whether the unmanned air vehicle 1 has taken off again.

The foregoing process allows the unmanned air vehicle 1 to take an image in a vertical direction from the unmanned air vehicle 1 with the camera 107 mounted on the unmanned air vehicle 1, determine whether a person has been detected in the crash probable region 52 superimposed on the whole image 51 thus taken, and, in a case where it has determined that a person has been detected, move itself so that no person is detected any longer in the crash probable region 52.

Details of Crash-Avoidance Flight Control Process

Next, the flight control process of the unmanned air vehicle for crash avoidance in a case where the presence of a person has been detected in the crash probable region 52, i.e. the crash-avoidance flight control process of step S6 of FIG. 7, is described in detail.

Figure 8:
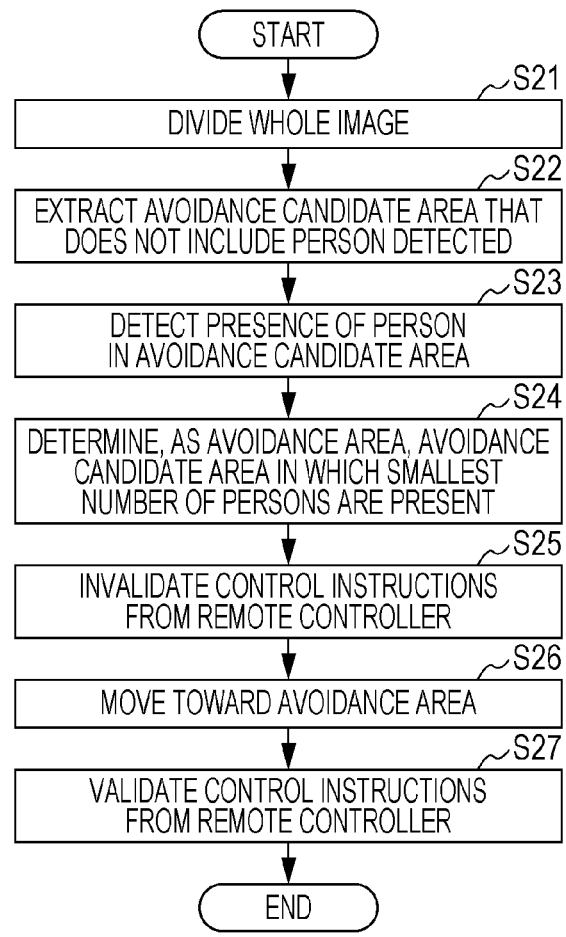
FIG. 8 is a flow chart for explaining a crash-avoidance flight control process of step S6 of FIG. 7.
Figure 9:
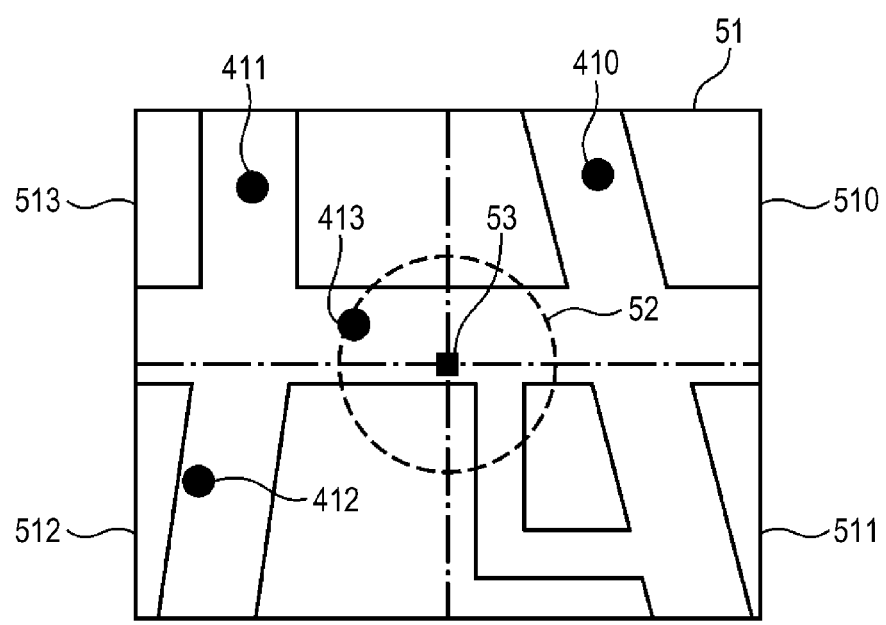
FIG. 9 is a diagram for explaining a method in the crash-avoidance flight control process for, with use of an image taken in a vertical direction from the unmanned air vehicle, determining a direction that the unmanned air vehicle flies.

FIG. 8 is a flow chart for explaining the crash-avoidance flight control process of step S6 of FIG. 7. FIG. 9 is a diagram for explaining a method in the crash-avoidance flight control process for, with use of an image taken in a vertical direction from the unmanned air vehicle 1, determining a direction that the unmanned air vehicle 1 flies.

In FIG. 9, the center of the whole image 51 represents the point 53 that is directly below the unmanned air vehicle 1 where a vertical line extending from the unmanned air vehicle 1 intersects the ground surface, and the crash probable region 52 is a region within a circle centered at the point 53. Further, the heads of persons 410 to 413 are present in the whole image 51. FIG. 9 shows a state in which the person 413 has been detected in the crash probable region 52.

The following describes the flow chart of FIG. 8 with reference to FIG. 9.

In Embodiment 1, once a person has been detected in the crash probable region 52, the crash-avoidance flight control process of the unmanned air vehicle 1 for crash avoidance is started. The crash-avoidance flight control process is performed by the crash-avoidance flight controller 114 of the controller 11 in accordance with the crash-avoidance program 123 stored in the memory 12.

First, the crash-avoidance flight controller 114 divides the whole image 51 into a plurality of regions to cause the unmanned air vehicle 1 to fly in a direction toward fewer persons so that no person is detected any longer from the crash probable region 52 (step S21). In Embodiment 1, as shown in FIG. 9, the whole region 51 is divided into four divided regions 510 to 513 centered around the point 53 that is directly below the unmanned air vehicle 1. The whole image 51 can be divided, for example, by superimposing an azimuth onto the whole image 51 with the azimuth sensor 105 and dividing the whole image 51 according to the azimuth. That is, the crash-avoidance flight controller 114 may radially divide the whole image 51 into four divided regions centered around the point 53 that is directly below the unmanned air vehicle 1. It should be noted that although, in Embodiment 1, the crash-avoidance flight controller 114 divides the whole image 51 into four regions, the crash-avoidance flight controller 114 may alternatively be configured to divide the whole image 51 into a first region including the person 413 detected and a second region other than the first region.

Next, the crash-avoidance flight controller 114 extracts, as avoidance candidate areas, those ones of the plurality of divided regions 510 to 513 which do not include the person 413 detected in the crash probable region 52 (step S22). An avoidance candidate area is a candidate for a direction that the unmanned air vehicle 1 moves to avoid a crash. In FIG. 9, the divided regions 510, 511, and 512 are extracted as avoidance candidate areas.

Next, the image processor 112 detects the presence of a person in each of the avoidance candidate areas 510, 511, and 512 extracted in the process of step S22 (step S23). This detection process is performed by the crash-avoidance flight controller 114 asking the imaging processor 112 to perform the process. This process for detecting a person through image recognition is the same process as the process of step S5 of FIG. 7 for detecting the presence of a person in the crash probable region 52.

Next, on the basis of a result of the detection of a person who is present in each of the avoidance candidate areas in the process of step S23, the crash-avoidance flight controller 114 calculates the number of persons who are present in each of the avoidance candidate areas, and determines, as an avoidance area toward which the unmanned air vehicle 1 moves to avoid a crash, the avoidance candidate area with the smallest number of persons present therein (step S24). In the case of FIG. 9, since the numbers of persons who are detected in the avoidance candidate areas 510, 511, and 512 are 1, 0, and 1, respectively, the crash-avoidance flight controller 114 determines the avoidance candidate area 511, in which the smallest number of persons are present, as an avoidance area.

Once an avoidance area has been determined in the process of step S24, it is only necessary to move the unmanned air vehicle 1 toward the avoidance area thus determined. However, the unmanned air vehicle 1 may be controlled by the remote controller 2. Therefore, the crash-avoidance flight controller 114 temporarily invalidates control instructions from the remote controller 2 before moving the unmanned air vehicle 1 toward the avoidance area thus determined (step S25). Specifically, the crash-avoidance flight controller 114 invalidates control instructions from the remote controller 2 by causing the basis flight controller 110 not to follow control instructions received from the remote controller 2. Note here that it is desirable that the operator 3 be notified in a case where control instructions from the remote controller 2 are invalidated. Without notification to the operator 3, the sudden uncontrollability of the unmanned air vehicle 1 may mislead the operator 3 into judging that the unmanned air vehicle 1 has failed. Therefore, it is desirable that the operator 3 be notified in a case where control instructions sent from the remote controller 2 to the unmanned air vehicle 1 are invalidated.

Once control instructions from the remote controller 2 are invalidated in the process of step S25, the crash-avoidance flight controller 114 controls the flight of the unmanned air vehicle 1 so that the unmanned air vehicle 1 moves in a direction toward the avoidance area 511 determined in the process of step S24 (step S26).

It should be noted that the crash-avoidance flight controller 114 needs to cause the unmanned air vehicle 1 to fly a distance obtained by subtracting, from the radius of the circle of the crash probable region 52, the distance from the point 53 that is directly below the unmanned air vehicle 1 to the position of the person 413 thus detected. The flight distance may be stored in advance or may be calculated every time the unmanned air vehicle 1 moves. Since the radius of the crash probable region 52 is known, the distance from the point 53 that is directly below the unmanned air vehicle 1 to the position of the person 413 thus detected can be calculated from a relative position from the point 53 that is directly below the unmanned air vehicle 1 to the position of the person 413 detected. For example, in a case where the radius of the crash probable region 52 centered at the point 53 that is directly below the unmanned air vehicle 1 is 6.0 m and the position of the person 413 detected in the crash probable region 52 is a position that is distant from the point 53 that is directly below the unmanned air vehicle 1 by two thirds of the radius of the crash probable region 52, the distance from the point 53 that is directly below the unmanned air vehicle 1 to the position of the person 413 is 4.0 m.

In some situation, the flight distance stored in advance may be so insufficient that even when flight control for crash avoidance is performed, use of the flight distance cannot cause no person to be detected any longer in the crash probable region 52. In this case, flight control for crash avoidance can be performed again so that no person is detected any longer in the crash probable region 52.

Once the flight control for crash avoidance in the process of step 26 causes no person to be present in the crash probable region 52, the crash avoidance flight controller 114 validates the control instructions from the remote controller 2 that were temporarily invalidated in the process of step S25 (step 27), and ends the process.

The foregoing process makes it possible to avoid a crash of the unmanned air vehicle 1 on a person even in the event of a sudden crash of the unmanned air vehicle 1 due to unforeseen circumstances such as failure.

It should be noted that although, in Embodiment 1, the number of avoidance candidate areas in which the smallest numbers of persons are present is 1 in the process of step S24 of FIG. 8, it is conceivable that, in reality, there may be a plurality of avoidance candidate areas in which the smallest numbers of persons are present. In that case, the crash-avoidance flight controller 114 needs to select one avoidance candidate area from among the plurality of avoidance candidate areas in which the smallest numbers of persons are present. The following describes a method for selecting one avoidance candidate area from among the plurality of avoidance candidate areas in which the smallest numbers of persons are present.

Figure 10:
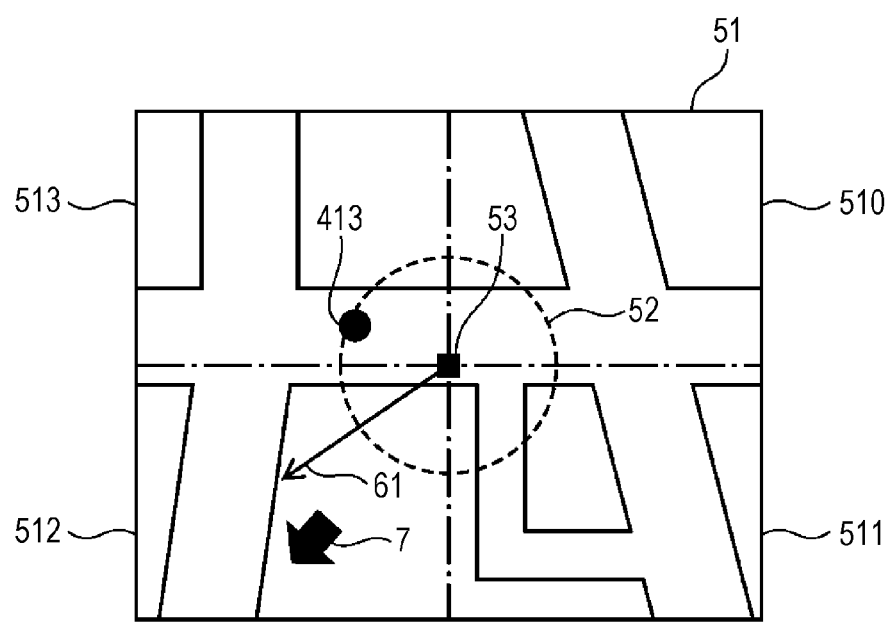
FIG. 10 is a diagram for explaining a first selection process for selecting one avoidance candidate area from among a plurality of avoidance candidate areas in which the smallest numbers of persons are present.
Figure 11:
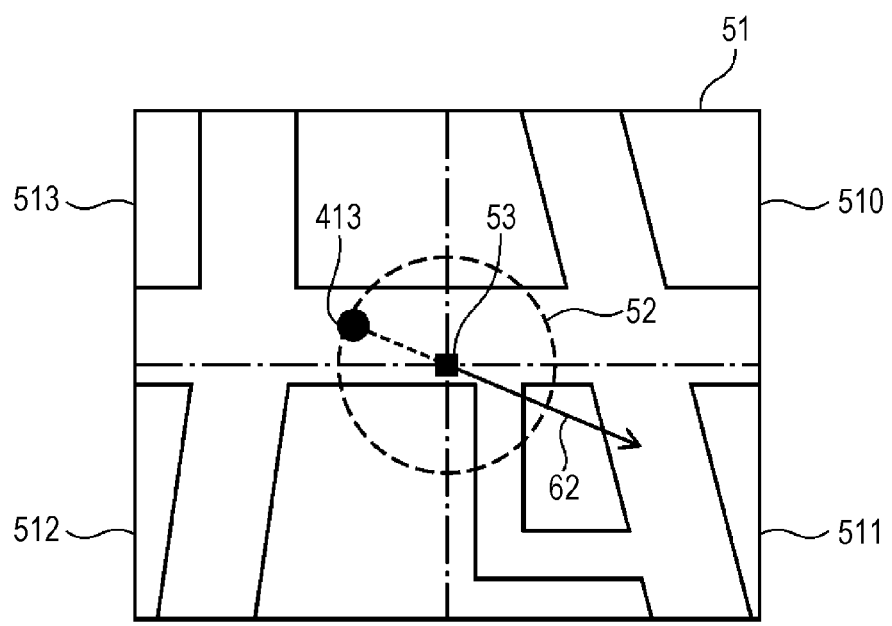
FIG. 11 is a diagram for explaining a second selection process for selecting one avoidance candidate area from among a plurality of avoidance candidate areas in which the smallest numbers of persons are present.
Figure 12:
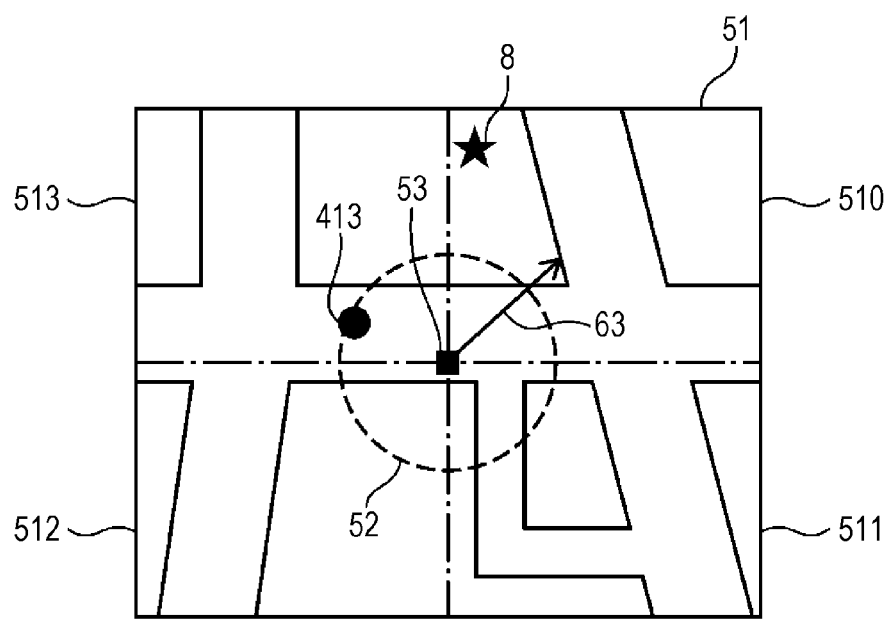
FIG. 12 is a diagram for explaining a third selection process for selecting one avoidance candidate area from among a plurality of avoidance candidate areas in which the smallest numbers of persons are present.

FIG. 10 is a diagram for explaining a first selection process for selecting one avoidance candidate area from among a plurality of avoidance candidate areas in which the smallest numbers of persons are present. FIG. 11 is a diagram for explaining a second selection process for selecting one avoidance candidate area from among a plurality of avoidance candidate areas in which the smallest numbers of persons are present. FIG. 12 is a diagram for explaining a third selection process for selecting one avoidance candidate area from among a plurality of avoidance candidate areas in which the smallest numbers of persons are present.

Each of FIGS. 10 to 12 shows an example of a selection process for selecting one of a plurality of avoidance candidate areas 510, 511, and 512 extracted as avoidance candidate areas in which the smallest numbers of persons have been detected from an image taken in a vertical direction from the unmanned air vehicle 1. Constituent elements in FIGS. 10 to 12 that are identical to those in FIG. 9 are given the same reference numerals.

Each of FIGS. 10 to 12 shows which direction to move the unmanned air vehicle 1 in when the numbers of persons detected in the plurality of avoidance candidate areas 510, 511, 512 are all 0 after the person 413 has been detected in the crash probable region 52 in an image taken in a vertical direction from the unmanned air vehicle 1.

In the first selection process shown in FIG. 10, the crash-avoidance flight controller 114 determines the avoidance candidate area 512, which is located in the same direction 7 as the wind is blowing, as an avoidance area from among the plurality of avoidance candidate areas 510, 511, and 512 in which the smallest numbers of persons have been detected, and moves the unmanned air vehicle 1 in a direction 61 toward the avoidance area 512. This configuration controls the unmanned air vehicle 1 to proceed in the same direction as the wind is blowing, thus making it possible to reduce the flight load on the flight by the crash avoidance.

In the second selection process shown in FIG. 11, the crash-avoidance flight controller 114 determines the avoidance candidate area 511, which is located in a position opposite to the position of the person 413 detected in the crash probable region 52 with respect to the point 53 that is directly below the unmanned air vehicle 1, as an avoidance area from among the plurality of avoidance candidate areas 510, 511, and 512 in which the smallest numbers of persons have been detected, and moves the unmanned air vehicle 1 in a direction 62 toward the avoidance area 511. That is, the crash-avoidance flight controller 114 moves the unmanned air vehicle 1 in the direction 62 from the position of the person 413 detected in the crash probable region 52 toward the point 53 that is directly below the unmanned air vehicle 1. This configuration makes it possible to most quickly cause no person to be detected any longer from the crash probable region 52.

In the third selection process shown in FIG. 12, the crash-avoidance flight controller 114 determines the avoidance candidate area 510, which is closest to a destination 8 to which the unmanned air vehicle 1 is going, as an avoidance area from among the plurality of avoidance candidate areas 510, 511, and 512 in which the smallest numbers of persons have been detected, and moves the unmanned air vehicle 1 in a direction 63 toward the avoidance area 510. This configuration controls the unmanned air vehicle 1 to move in the same direction as the direction toward the destination, thus making it possible to shorten the flight distance to the destination.

Each of FIGS. 10 to 12 has described a method for selecting one avoidance candidate area among a plurality of avoidance candidate areas in which the smallest numbers of persons have been detected. Such a method may also serve as a process for controlling the movement of the unmanned air vehicle 1 to avoid a crash of the unmanned air vehicle 1 on a person detected in the crash probable region 52.

It should be noted that although Embodiment 1 performs the process for controlling the flight of the unmanned air vehicle 1 to avoid a crash of the unmanned air vehicle 1 on a person detected in the crash probable region 52, the process for controlling the flight of the unmanned air vehicle 1 to avoid a crash of the unmanned air vehicle 1 on a person detected in the crash probable region 52 does not need to be performed in a case where the person is the operator 3. The operator 3 controls the unmanned air vehicle 1 while visually checking it. Therefore, even if the unmanned air vehicle 1 crashes, the operator 3 can avoid a crash of the unmanned air vehicle 1 on the operator 3. Further, detecting the presence of the operator 3 in the crash probable region 52 and automatically moving the unmanned air vehicle 1 when the operator 3 is controlling the unmanned air vehicle 1 while visually checking it interferes with the control.

Therefore, in a case where a person has been detected by the image processor 112, the central controller 115 may determine whether the person detected in the crash probable region 52 satisfies a preset condition. Note here that the person is an example of an object of avoidance and the present condition is for example that the person is the operator 3. The crash-avoidance flight controller 114 does not control the flight of the unmanned air vehicle 1 in a case where the central controller 115 has determined that the person detected in the crash probable region 52 satisfies the preset condition. That is, the crash-avoidance flight controller 114 does not control the flight of the unmanned air vehicle 1 in a case where the central controller 115 has determined that the person detected in the crash probable region 52 is the operator 3.

Alternatively, in a case where the person detected in the crash probable region 52 is the operator 3, the unmanned air vehicle 1 may notify the remote controller 2 of the operator 3 that the operator 3 has been detected in the crash probable region 52. Furthermore, after the notification, the unmanned air vehicle 1 may inquire of the operator 3 whether to perform the flight control process for crash avoidance, or the operator 3 may choose in advance whether to perform the flight control process for crash avoidance in a case where the person detected in the crash probable region 52 is the operator 3.

It should be noted that, for example, the remote controller 2 may notify the unmanned air vehicle 1 of positional information of the operator 3 and the unmanned air vehicle 1 may determine whether the position of the person detected in the crash probable region 52 matches the position of the operator 3 as notified from the remote controller 2 and thereby determine whether the person detected in the crash probable region 52 is the operator 3. Alternatively, the unmanned air vehicle 1 may store an facial image of the operator 3 in advance, compare a facial image of the person detected in the crash probable region 52 with the facial image stored in advance of the operator 3, and thereby determine whether the person detected in the crash probable region 52 is the operator 3.

The foregoing has described a process that is performed when the person detected in the crash probable region 52 is the operator 3. However, a process similar to that which is performed in a case where the person detected in the crash probable region 52 is the operator 3 may be performed not only in a case where the person detected in the crash probable region 52 is the operator 3, but also in the case of a person concerned who is visually checking the flight of the unmanned air vehicle 1, e.g., a person called a visual observer who plays the role of assisting visibility by the operator 3.

It should be noted that although, in Embodiment 1, the flight of the unmanned air vehicle 1 is controlled for crash avoidance in a case where the presence of a person has been detected in the crash probable region 52, the operator 3 may be notified in a case where the presence of a person has been detected in the crash probable region 52 and the operator 3 may control the unmanned air vehicle 1 to fly so that no person is detected any longer from the crash probable region 52. This configuration makes it possible to perform flight control for crash avoidance in accordance with the will of the operator 3.

Further, a warning region that is adjacent to an outer edge portion of the crash probable region 52 may be further superimposed onto the image taken, and in a case where the presence of a person has been detected in the warning region, the operator 3 may be notified and control the unmanned air vehicle 1 to fly so that no person is detected any longer from the warning region. This configuration makes it possible to perform flight control for crash avoidance in accordance with the will of the operator 3 in a case where the presence of a person has been detected in the warning region. Further, the unmanned air vehicle 1 can autonomously perform flight control for crash avoidance in a case where the presence of a person has been detected in the crash probable region 52.

Alternatively, in a case where the presence of a person has been detected in the crash probable region 52, it is possible to inquire of the operator 3 whether to control the flight of the unmanned air vehicle 1 for crash avoidance and determine, on the basis of a result of response to the inquiry, whether to control the flight of the unmanned air vehicle 1 for crash avoidance. That is, the communicator 109 may communicate with a terminal device (remote controller 2) that the operator 3, who controls the unmanned air vehicle 1, has with him/her, and in a case where a person has been detected by the image processor 112, the communicator 109 may inquire of the terminal device whether to control the flight of the unmanned air vehicle 1 through the crash-avoidance flight controller 114. Then, upon receiving, from the terminal device, a result of response indicating whether to control the flight of the unmanned air vehicle 1 through the crash-avoidance flight controller 114, the crash-avoidance flight controller 114 may determine, according to the result of response, whether to control the flight of the unmanned air vehicle 1. It should be noted that the person is an example of an object of avoidance. This configuration makes it possible to perform flight control for crash avoidance in accordance with the will of the operator 3.

Details of Crash Probable Region Changing Process

Next, the changing process for changing the crash probable region 52 of the unmanned air vehicle 1, i.e. the crash probable region changing process of step S7 of FIG. 7, is described in detail.

Figure 13:
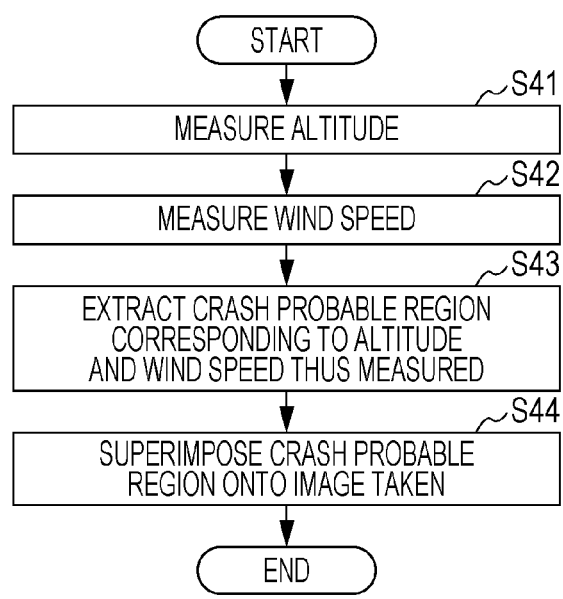
FIG. 13 is a flow chart for explaining a crash probable region changing process of the unmanned air vehicle of step S7 of FIG. 7.

FIG. 13 is a flow chart for explaining the crash probable region changing process of the unmanned air vehicle 1 of step S7 of FIG. 7.

The crash probable region changing process of the unmanned air vehicle 1 is performed by the crash probable region determiner 111 in accordance with the crash probable region determination program 122.

First, the crash probable region determiner 111 measures the altitude of the unmanned air vehicle 1 with the altitude sensor 100 (step S41).

Next, the crash probable region determiner 11 measures the speed of the wind around the unmanned air vehicle 1 with the wind speed sensor 101 (step S42).

Next, the crash probable region determiner 111 extracts, from the crash probable region table 124 stored in the memory 12, a crash probable region corresponding to the altitude measured in the process of step S41 and the wind speed measured in the process of step S42, and determines, as a current crash probable region, the crash probable region thus extracted (step S43).

Next, the crash probable region determiner 111 asks the image processor 112 to superimpose, onto the image taken by the camera 107, the crash probable region determined in step S43 (step S44).

The foregoing process makes it possible to change crash probable regions according to the altitude of the unmanned air vehicle 1 and the speed of the wind around the unmanned air vehicle 1.

If the crash probable region is fixed, there is a possibility, in some situations, that the fixed crash probable region may not be sufficiently large in area or the fixed crash probable region may be much larger in area than is necessary.

For example, in a case where the crash probable region is narrowly set, a crash of the unmanned air vehicle 1 from a high altitude may cause the unmanned air vehicle 1 to crash over the set crash probable region due to the influence of the wind during the crash. In this case, the unmanned air vehicle 1 may fall onto a person who is outside of the crash probable region. Therefore, in a case where the unmanned air vehicle 1 flies at a high altitude, it is not preferable, for the safety of flight of the unmanned air vehicle 1, that the crash probable region be narrowly set.

On the other hand, in a case where the crash probable region is widely set, even a person who is present in a position on which the unmanned air vehicle 1 has an almost 0% chance of crashing may be detected even when the unmanned air vehicle 1 is flying at a low altitude, as the crash probable region is widely set. This may cause the process for crash avoidance to be performed much more than is necessary. In such a case where the unmanned air vehicle 1 flies at a low altitude, even a person who is present in a position on which the unmanned air vehicle 1 has an almost 0% chance of crashing may be detected and the process for crash avoidance may be performed much more than is necessary. This may make the unmanned air vehicle 1 unable to fly as intended. Therefore, in a case where the unmanned air vehicle 1 flies at a low altitude, it is not preferable, for the efficiency of flight of the unmanned air vehicle 1, that the crash probable region be widely set.

In contrast to this, the unmanned air vehicle of the present disclosure dynamically changes crash probable regions according to the altitude and the wind speed, thus making it possible to prevent the unmanned air vehicle 1 from crashing on a person and to fly the unmanned air vehicle 1 efficiently.

It should be noted that although, in Embodiment 1, crash probable regions are changed according to both the altitude and the wind speed, crash probable regions may be changed according to either the altitude or the wind speed for the sake of simplification of configuration. That is, the crash probable region determiner 111 may change crash probable regions according to the altitude measured by the altitude sensor 100. In this case, the crash probable region table 124 stores crash probable regions associated only with altitudes. Further, the crash probable region determiner 111 may change crash probable regions according to the wind speed measured by the wind speed sensor 101. In this case, the crash probable region table 124 stores crash probable regions associated only with wind speeds. Note, however, that as a method for more accurately changing crash probable regions, it is desirable that crash probable regions be changed according to both the altitude and the wind speed.

Further, the crash probable region determiner 111 may change crash probable regions according to the wind direction measured by the wind direction sensor 102 and the wind speed measured by the wind speed sensor 101. In this case, the crash probable region table 124 stores crash probable regions associated with wind directions and wind speeds. Further, the crash probable region determiner 111 may change crash probable regions according to the flight speed measured by the speed sensor 103 and the azimuth measured by the azimuth sensor 105. In this case, the crash probable region table 124 stores crash probable regions associated with flight speeds and azimuths.

It should be noted that although, in Embodiment 1, the unmanned air vehicle 1 stores the crash probable region table 124 in advance in the memory 12, the unmanned air vehicle 1 may alternatively store a predetermined program in advance and calculate a crash probable region by applying the predetermined program to the values of an altitude and a wind speed that have been measured.

It should be noted that although, in Embodiment 1, the operator 3 controls the unmanned air vehicle 1 in real time with the remote controller 2, Embodiment 1 is also applicable to a case where the unmanned air vehicle 1 autonomously flies in accordance with flight route information set in advance in the unmanned air vehicle 1.

It should be noted that although, in Embodiment 1, the unmanned air vehicle 1 performs the image processing and the crash probable region changing process, the unmanned air vehicle 1 may alternatively send an image taken to the remote controller 2 or the external device (not illustrated) such as a server and the remote controller 2 or the external device may perform the image processing and the crash probable region changing process.

Making the unmanned air vehicle 1 execute high-level processing may lead to an increase in cost. Further, the unmanned air vehicle 1 may fail by crashing, as it may crash due to the influence of a wind or an obstacle. Therefore, a process that requires a high-level processing capacity may be performed by the remote controller 2 or the external device such as a server.

Note, however, that since disruption of the communication with the remote controller 2 or the external device such as a server makes it impossible to detect the presence of a person in the crash probable region and disables flight control for crash avoidance, it is preferable to make the unmanned air vehicle 1 internally execute the processing.

Further, although, in Embodiment 1, the object of avoidance is for example a person, the present disclosure is not limited to this and the object of avoidance may be an animal, an automobile, or the like.

Advantageous Effects

As described above, according to Embodiment 1 of the present disclosure, the unmanned air vehicle 1 superimposes, onto an image taken in a vertical direction from the unmanned air vehicle 1, a crash probable region 52 on which the unmanned air vehicle 1 is likely to crash, and upon detection of a person in the crash probable region 52, the unmanned air vehicle 1 moves itself so that no person is detected any longer from the crash probable region 52. This configuration makes it possible to avoid a crash of the unmanned air vehicle 1 on the head of a person due to unforeseen circumstances such as failure, although it is usually difficult to set the head of a person in advance in a no-fly area in which a flight of the unmanned air vehicle 1 is prohibited.

Further, a dynamic change of the crash probable region 52 according to the altitude and wind speed measured by the unmanned air vehicle 1 makes it possible to change the area of the crash probable region 52 according to the status of the unmanned air vehicle 1 and fly the unmanned air vehicle 1 safely and efficiently.

Embodiment 2

Embodiment 2 describes, as a method for avoiding a crash upon detection of the presence of a person in a crash probable region, an example in which flight of an unmanned air vehicle is controlled to lower the altitude of the unmanned air vehicle and thereby narrow the crash probable region so that no person is detected any longer from the crash probable region.

Figure 14:
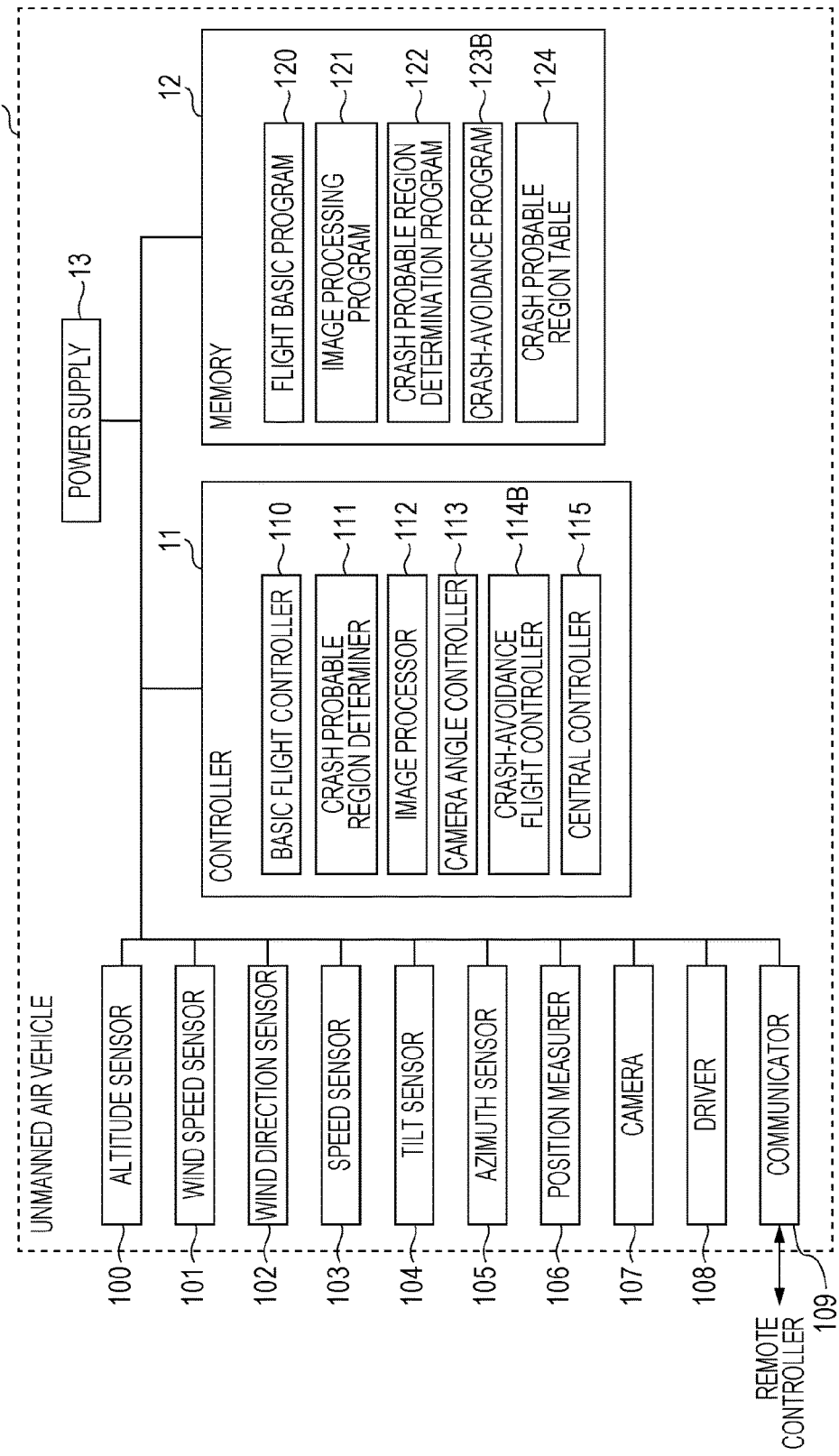
FIG. 14 is a block diagram showing a functional configuration of an unmanned air vehicle according to Embodiment 2 of the present disclosure.

FIG. 14 is a block diagram showing a functional configuration of an unmanned air vehicle 1B according to Embodiment 2 of the present disclosure. Elements that are identical to those shown in FIG. 3 are given the same reference numerals, and as such, are not described in detail here.

The unmanned air vehicle 1B shown in FIG. 14 differs from the unmanned air vehicle 1 shown in FIG. 3 in terms of the configuration of a crash-avoidance flight controller 114B and a crash-avoidance program 123B.

Upon detection of a person by the image processor 112, the crash-avoidance flight controller 114B controls flight of the unmanned air vehicle 1B to lower the altitude of the unmanned air vehicle 1B. It should be noted that the person is an example of an object of avoidance. The crash-avoidance flight controller 114B performs processing in accordance with the crash-avoidance program 123B.

The crash probable region determiner 111 makes a crash probable region narrower as the altitude of the unmanned air vehicle 1B becomes lower.

Figure 15:
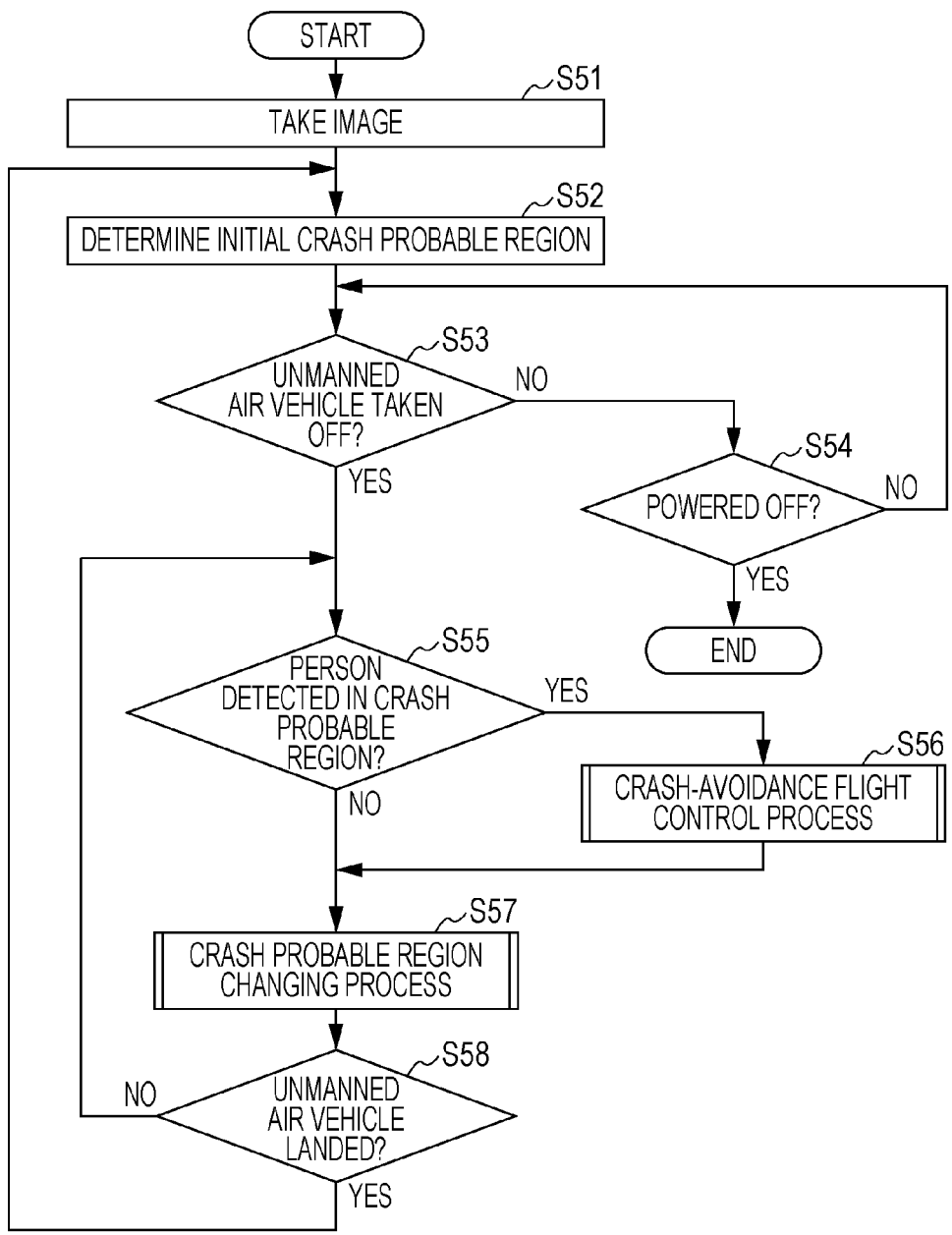
FIG. 15 is a flow chart for explaining a process of the unmanned air vehicle according to Embodiment 2 of the present disclosure.

FIG. 15 is a flow chart for explaining a process of the unmanned air vehicle 1B according to Embodiment 2. The unmanned air vehicle 1B according to Embodiment 2 detects the presence of a person in the crash probable region superimposed on the shot image and, in a case where the presence of a person has been detected in the crash probable region, controls its flight so that no person is detected any longer from the crash probable region. It should be noted that the processes of steps S51 to S55 and S57 to S58 shown in FIG. 15 are identical to the processes of steps S1 to S5 and S7 to S8 shown in FIG. 7, and as such, are not described in detail here.

In the flow chart shown in FIG. 15, the crash-avoidance flight control process of step S56 differs from the crash-avoidance flight control process of step S6 shown in FIG. 7.

Figure 16:
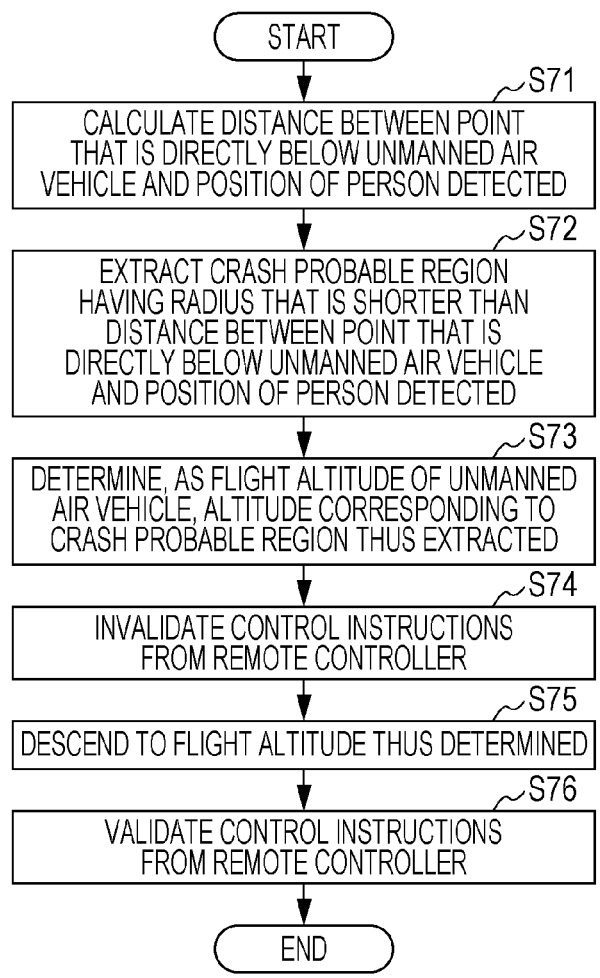
FIG. 16 is a flow chart for explaining a crash-avoidance flight control process of step S56 of FIG. 15.
Figure 17:
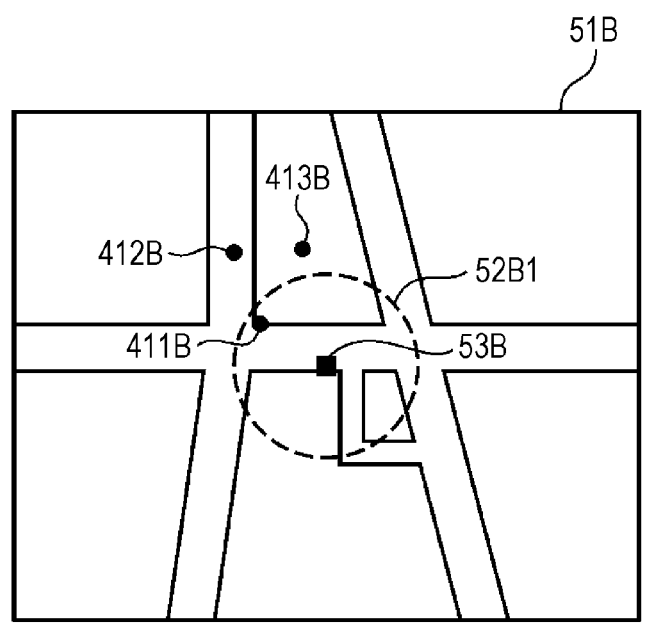
FIG. 17 is a diagram showing an image taken in a vertical direction from the unmanned air vehicle and a crash probable region at a point in time where the presence of persons has been detected in the crash probable region.
Figure 18:
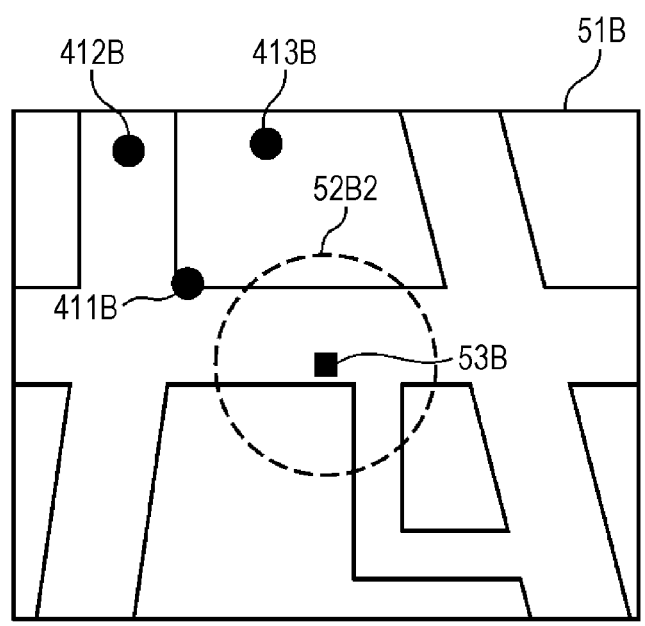
FIG. 18 is a diagram showing an image taken in a vertical direction from the unmanned air vehicle and a crash probable region at a point in time where the unmanned air vehicle performed flight control for crash avoidance.

FIG. 16 is a flow chart for explaining the crash-avoidance flight control process of step S56 of FIG. 15. FIG. 17 is a diagram showing an image taken in a vertical direction from the unmanned air vehicle 1B and a crash probable region 52B1 at a point in time where the presence of persons has been detected in the crash probable region 52B1. FIG. 18 is a diagram showing an image taken in a vertical direction from the unmanned air vehicle 1B and a crash probable region 52B2 at a point in time where the unmanned air vehicle 1B performed flight control for crash avoidance.

The following describes the flow chart of FIG. 16 with reference to FIGS. 17 and 18.

In Embodiment 2, once a person is detected in the crash probable region 52B1, the crash-avoidance flight control process of the unmanned air vehicle 1 for crash avoidance is started. The crash-avoidance flight control process is performed by the crash-avoidance flight controller 114B of the controller 11 in accordance with the crash-avoidance program 123B stored in the memory 12.

First, the crash-avoidance flight controller 114B calculates the distance between a point 53B that is directly below the unmanned air vehicle 1B and the position of a person 411B detected in the crash probable region 52B1 by the image processor 112 (step S71). Since the radius of the crash probable region 52B1 is known, the distance between the point 53B that is directly below the unmanned air vehicle 1B and the position of the person 411B detected can be calculated from a relative position from the point 53B that is directly below the unmanned air vehicle 1 to the position of the person 411B detected.

In Embodiment 2, as shown in FIG. 17, for example, the unmanned air vehicle 1B flies at an altitude of 20 m, the speed of the wind around the unmanned air vehicle 1B is 5.0 m/s, and the position of the person 411B detected in the crash probable region 52B1 is a position that is distant from the point 53B that is directly below the unmanned air vehicle 1B by three quarters of the radius of the crash probable region 52B1. In this case, according to the crash probable region table 124 shown in FIG. 5, the crash probable region 52B1 is in the shape of a circle with a radius of 6.0 m centered at the point 53B that is directly below the unmanned air vehicle 1B. Therefore, since the position of the person 411B detected in the crash probable region 52B1 is a position that is distant from the point 53B that is directly below the unmanned air vehicle 1B by three quarters of the radius, the distance from the point 53B that is directly below the unmanned air vehicle 1B to the position of the person 411B detected is 4.5 m.

Next, the crash-avoidance flight controller 114B extracts, from the crash probable region table 124, a crash probable region having a radius that is shorter than the calculated distance from the point 53B that is directly below the unmanned air vehicle 1 to the position of the person 411B detected (step S72). In Embodiment 2, since the distance from the point 53B that is directly below the unmanned air vehicle 1B to the position of the person 411B detected is 4.5 m, the crash-avoidance flight controller 114B extracts, from the crash probable region table 124, a crash probable region with a radius of shorter than 4.5 m. In Embodiment 2, since the wind speed is 5.0 m/s, the circle with a radius of 4.0 m, which corresponds to the altitudes of 5 to 15 m, serves as the shape of the crash probable region that satisfies the condition.

Next, the crash-avoidance flight controller 114B determines an altitude that corresponds to the crash probable region thus extracted (step S73). In Embodiment 2, since the crash probable region thus extracted has a radius of 4.0 m, the flight altitude of the unmanned air vehicle 1B is set at an altitude that falls within the range of 5 to 15 m, which corresponds to the crash probable region. In Embodiment 2, the crash-avoidance flight controller 114B sets the flight altitude of the unmanned air vehicle 1B at an altitude of 10 m, which is the median in the range of 5 to 15 m.

Once the flight altitude has been determined in the process of step S73, it is only necessary to move the unmanned air vehicle 1B so that the flight altitude thus determined is attained. However, the unmanned air vehicle 1B may be controlled by the remote controller 2. Therefore, the crash-avoidance flight controller 114B temporarily invalidates control instructions from the remote controller 2 before moving the unmanned air vehicle 1B to the flight altitude thus determined (step S74). It should be noted that a specific process for invalidating control instructions is not described here, as it has already been described in step S25 of FIG. 8.

Once control instructions from the remote controller 2 are invalidated in the process of step S74, the crash-avoidance flight controller 114B controls the flight of the unmanned air vehicle 1B so that the unmanned air vehicle 1B descends toward the flight altitude determined in the process of step S73 (step S75). FIG. 18 shows an image taken after the unmanned air vehicle 1B has flown toward the flight altitude determined in the process of step S73. Lowering the altitude of the unmanned air vehicle 1B makes the crash probable region narrower, so that no person is present any longer in the crash probable region 52B2.

After the process of step S75, the crash avoidance flight controller 114B validates the control instructions from the remote controller 2 that were temporarily invalidated (step S76), and ends the process.

The foregoing process makes it possible to avoid a crash of the unmanned air vehicle 1B on a person even in the event of a sudden crash of the unmanned air vehicle 1B due to unforeseen circumstances such as failure.

It should be noted that in a case where, in the process of step S72, there are a plurality of crash probable regions having radii that are shorter than the distance from the point 53B that is directly below the unmanned air vehicle 1B to the position of the person 411B detected, the crash-avoidance flight controller 114B selects one crash probable region from among the plurality of crash probable regions. An example of the selecting method is to select a crash probable region with the highest altitude. This configuration makes it possible to make the flight distance for crash avoidance shortest.

Alternatively, the crash-avoidance flight controller 114B may detect the presence of persons in the whole shot image and select one crash probable region from among the plurality of crash probable regions according to the number of persons. This configuration makes it possible to adjust the crash probable region according to the number of persons detected.

In this configuration, for example, the crash-avoidance flight controller 114B selects a crash probable region with the lowest altitude from among the plurality of crash probable regions in a case where the number of persons detected in the whole image is larger than a predetermined number, and the crash-avoidance flight controller 114B selects a crash probable region with the highest altitude from among the plurality of crash probable regions in a case where the number of persons detected in the whole image is smaller than the predetermined number. By flying the unmanned air vehicle 1B at a low altitude when the number of persons who are present in the whole image is larger than the predetermined number, this configuration makes it possible to prevent the unmanned air vehicle 1B from crashing on a person. Further, by flying the unmanned air vehicle 1B at a high altitude when the number of persons who are present in the whole image is smaller than the predetermined number, this configuration makes it possible to prevent the unmanned air vehicle 1B from crashing on a person with minimum movements and fly the unmanned air vehicle 1B at an altitude that is close to the original altitude of the unmanned air vehicle 1B.

It should be noted that although Embodiment 2 describes an example in which the crash probable region is narrowed by lowering the altitude of the unmanned air vehicle 1B in a case where a person has been detected in the crash probable region, it is desirable that the process for narrowing the crash probable region by lowering the altitude of the unmanned air vehicle 1B be performed in advance in a case where no person has been detected in the crash probable region but a person has been detected in a predetermined region outside of the crash probable region.

That is, the image processor 112 may detect the presence of a person in a region between an outer edge portion of the image and an outer edge portion of the crash probable region. Note here that the person is an example of an object of avoidance. In a case where the number of persons detected by the image processor 112 is larger than the predetermined number, the crash-avoidance flight controller 114B controls the flight of the unmanned air vehicle 1B to lower the altitude of the unmanned air vehicle 1B. The crash probable region determiner 111 makes the crash probable region narrower as the altitude of the unmanned air vehicle 1B becomes lower. An increase in altitude of the unmanned air vehicle 1B leads to a higher possibility of a collision of the unmanned air vehicle 1B with a bird or the like or a crash of the unmanned air vehicle 1B beyond the crash probable region due to a sudden gust. Therefore, by lowering the altitude of the unmanned air vehicle 1B in advance and thereby narrowing the crash probable region in advance in a case where no person has been detected in the crash probable region but the presence of a person has been detected in the region between the outer edge portion of the image and the outer edge portion of the crash probable region, this configuration makes it possible to prevent the unmanned air vehicle 1 from crashing on the person.

It should be noted that, in the crash probable region table 124 of FIG. 5, the whole image serves as a crash probable region in the altitude range of 0 to 5 m. Therefore, in the process of step S72 of Embodiment 2, the crash-avoidance flight controller 114B does not extract a crash probable region corresponding to the altitude range of 0 to 5 m in extracting a crash probable region having a radius that is shorter than the distance from the point 53B that is directly below the unmanned air vehicle 1B to the position of the person 411B detected. However, since the crash probable region is narrowest when the altitude is 0 to 5 m, it is desirable that a crash probable region corresponding to the altitude range of 0 to 5 be extracted.

Embodiment 3

Embodiment 3 describes an example in which a crash probable region is determined more appropriately by changing crash probable regions with reference to the direction and speed of movement of an unmanned air vehicle in a process for changing crash probable regions.

Figure 19:
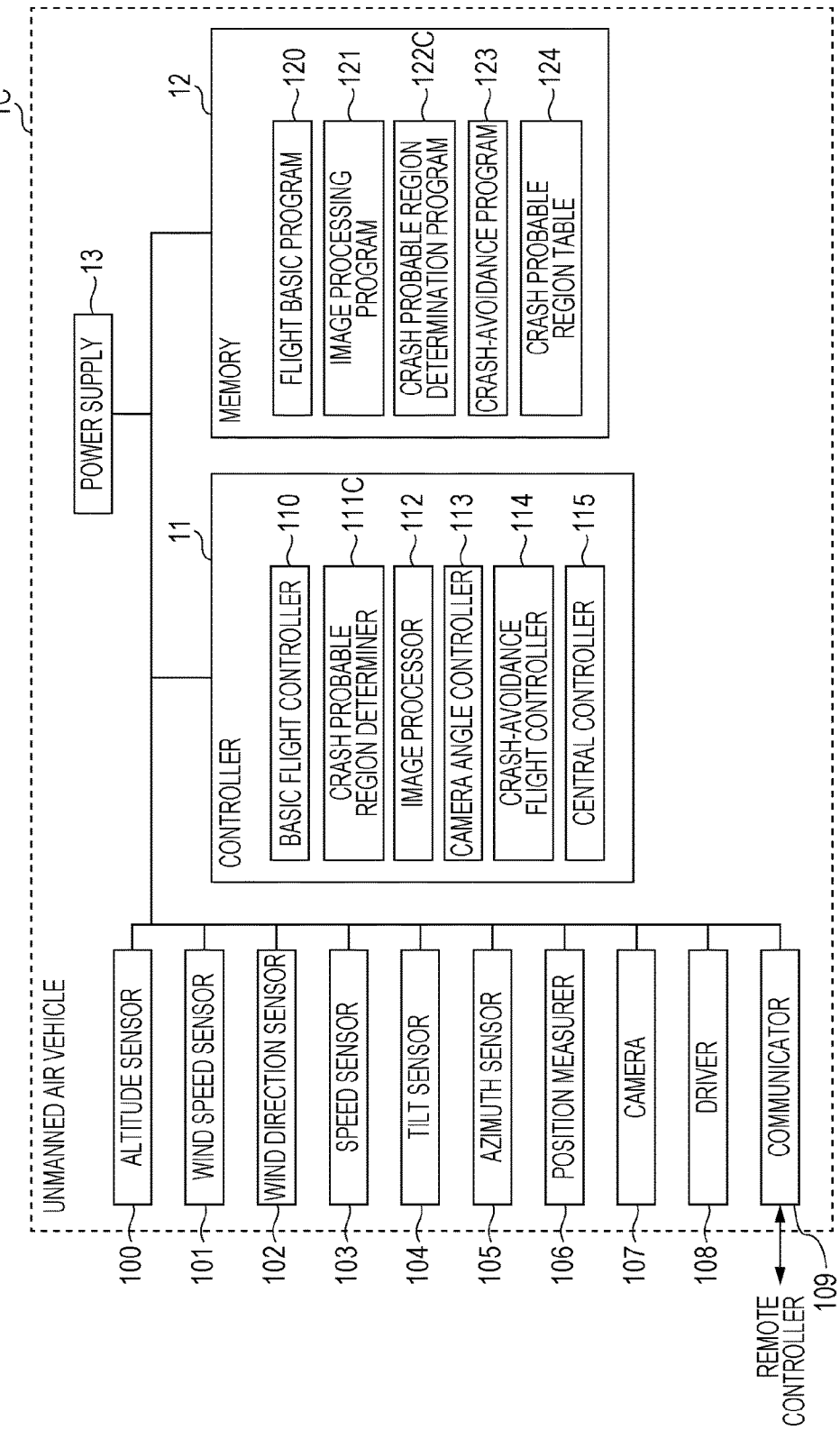
FIG. 19 is a block diagram showing a functional configuration of an unmanned air vehicle according to Embodiment 3 of the present disclosure.

FIG. 19 is a block diagram showing a functional configuration of an unmanned air vehicle 1C according to Embodiment 3 of the present disclosure. Elements that are identical to those shown in FIG. 3 are given the same reference numerals, and as such, are not described in detail here.

The unmanned air vehicle 1C shown in FIG. 19 differs from the unmanned air vehicle 1 shown in FIG. 3 in terms of the configuration of a crash probable region determiner 111C and a crash probable region determination program 122C.

The crash probable region determiner 111C performs processing in accordance with the crash probable region determination program 122C.

Figure 20:
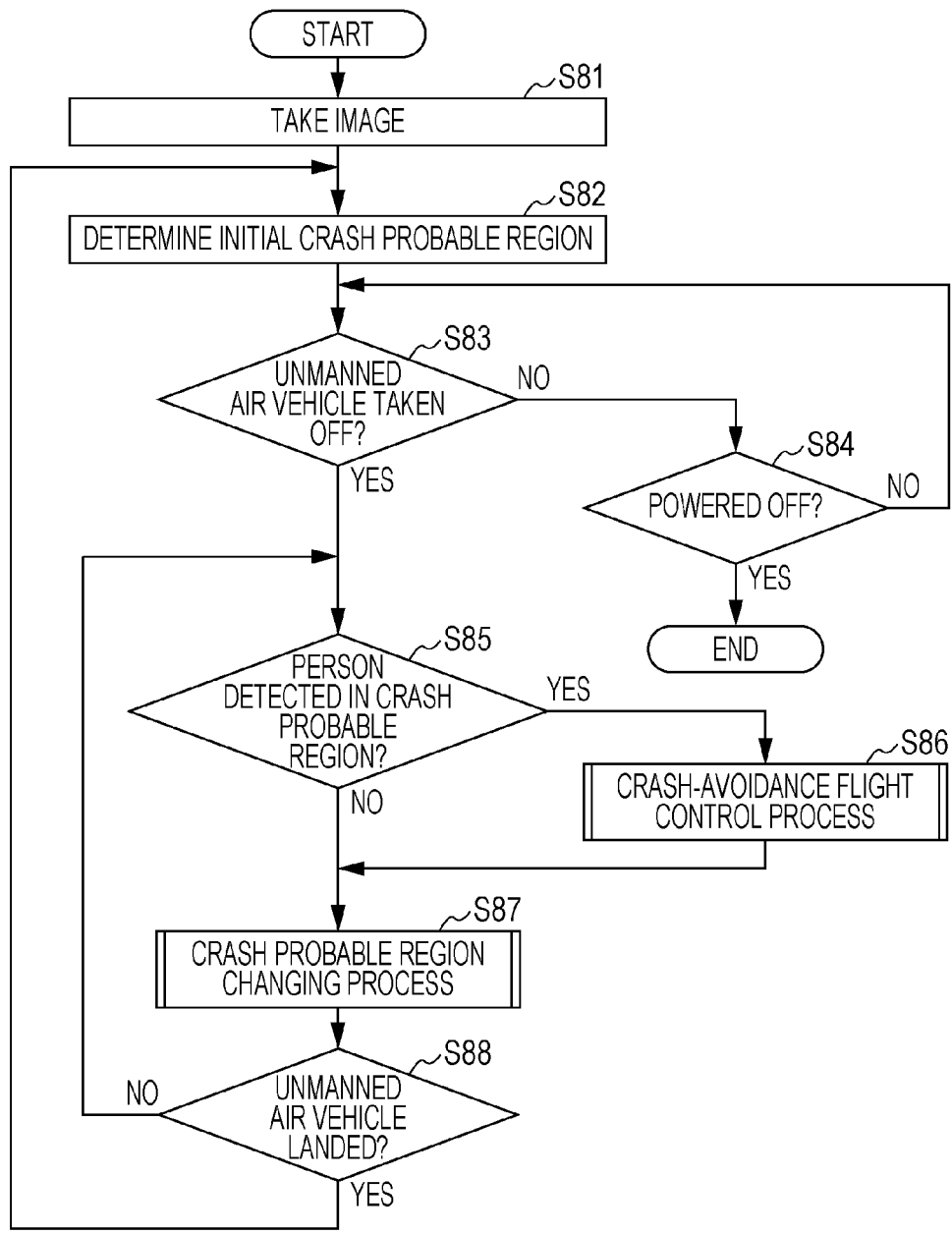
FIG. 20 is a flow chart for explaining a process of the unmanned air vehicle according to Embodiment 3 of the present disclosure.

FIG. 20 is a flow chart for explaining a process of the unmanned air vehicle 1C according to Embodiment 3. The unmanned air vehicle 1C according to Embodiment 3 detects the presence of a person in a crash probable region superimposed on a shot image and, in case where the presence of a person has been detected in the crash probable region, controls its flight so that no person is detected any longer from the crash probable region. It should be noted that the processes of steps S81 to S86 and S88 shown in FIG. 20 are identical to the processes of steps S1 to S6 and S8 shown in FIG. 7, and as such, are not described in detail here.

In the flow chart shown in FIG. 20, the crash probable region changing process of step S87 differs from the crash probable region changing process of step S7 shown in FIG. 7.

Figure 21:
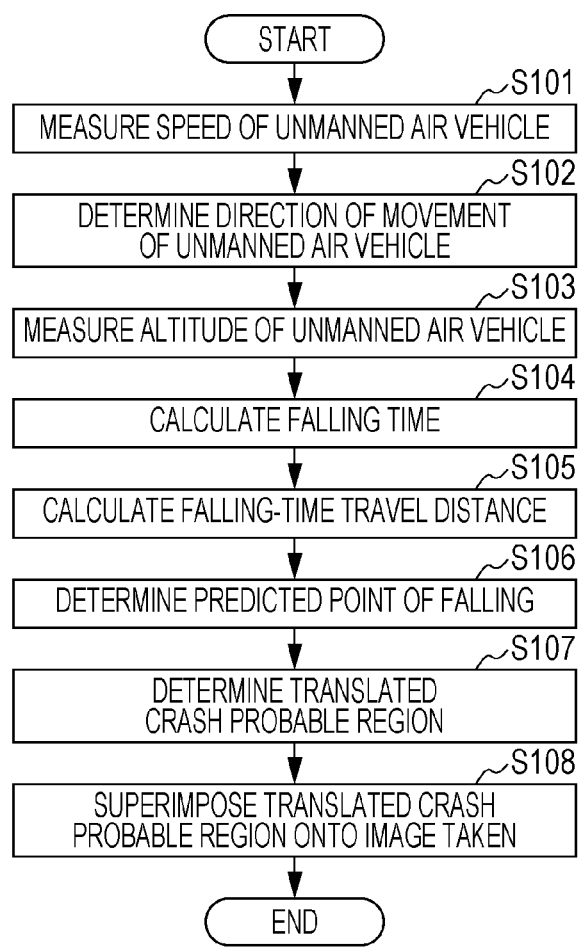
FIG. 21 is a flow chart for explaining a crash probable region changing process of the unmanned air vehicle of step S87 of FIG. 20.

FIG. 21 is a flow chart for explaining the crash probable region changing process of step S87 of FIG. 20. The following describes the flow chart of FIG. 21.

First, the crash probable region determiner 111C measures the speed of the unmanned air vehicle 1C with the speed sensor 103 (step S101).

Next, the crash probable region determiner 111C determines the direction of movement of the unmanned air vehicle 1C on an image taken by the camera 107 (step S102). Specifically, the crash probable region determiner 111C measures positional information of the unmanned air vehicle 1C more than once with the position measurer 106 and determines the direction of flight of the unmanned air vehicle 1C on the basis of the plural pieces of positional information thus measured. Next, the crash probable region determiner 111C measures an azimuth with the azimuth sensor 105 and superimposes the azimuth thus measured onto the image taken by the camera 107. Then, the crash probable region determiner 111C determines the direction of movement of the unmanned air vehicle 1C on the image by superimposing the direction of flight thus determined of the unmanned air vehicle 1C onto the image onto which the azimuth has been superimposed.

Next, the crash probable region determiner 111C measures the altitude of the unmanned air vehicle 1C with the altitude sensor 100 (step S103).

Next, on the basis of the altitude measured in the process of step S103, the crash probable region determiner 111C calculates a falling time it takes the unmanned air vehicle 1C to fall onto the ground (step S104). It should be noted that the falling time can be calculated on the basis of the rule of free fall.

Next, the crash probable region determiner 111C calculates the distance that the unmanned air vehicle 1C travels (hereinafter referred to as "falling-time travel distance") during passage of the falling time calculated in the process of step S104 (step S105). It should be noted that the falling-time travel distance can be calculated by multiplying the speed of the unmanned air vehicle 1C as measured in the process of step S101 by the falling time calculated in the process of step S104.

Next, the crash probable region determiner 111C determines a predicted point of falling that is distant from a point that is directly below the unmanned air vehicle 1C in the direction of movement of the unmanned air vehicle 1C as determined in the process of step S102 by the falling-time travel distance calculated in the process of step S105 (step S106).

Next, the crash probable region determiner 111C determines a translated crash probable region in which a center point of a crash probable region centered at the point that is directly below the unmanned air vehicle 1C has been translated from the point that is directly below the unmanned air vehicle 1C to the predicted point of falling (step S107).

Next, the crash probable region determiner 111C asks the image processor 112 to superimpose the translated crash probable region determined in step S107 onto the image taken by the camera 107.

Figure 22:
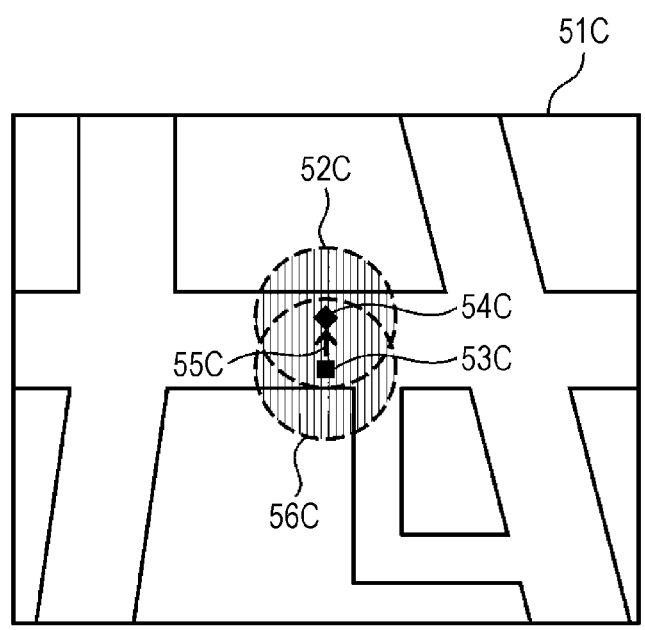
FIG. 22 is a diagram showing an example of a shot image onto which a translated crash probable region has been superimposed in the crash probable region changing process according to Embodiment 3 of the present disclosure.

FIG. 22 is a diagram showing an example of a shot image onto which a translated crash probable region has been superimposed in the crash probable region changing process according to Embodiment 3 of the present disclosure.

In FIG. 22, the center of a shot image 51C indicates a point 53C that is directly below the unmanned air vehicle 1C. The crash probable region determiner 111C determines a predicted point of falling 54C that is distant from the point 53C that is directly below the unmanned air vehicle 1C in a direction of movement 55C of the unmanned air vehicle 1C by the falling-time travel distance. Then, the crash probable region determiner 111C determines a translated crash probable region 52C in which a center point of a crash probable region 56C centered at the point 53C that is directly below the unmanned air vehicle 1C has been translated from the point 53C that is directly below the unmanned air vehicle 1C to the predicted point of falling 54C. The crash probable region determiner 111C superimposes the translated crash probable region 52C thus determined onto the shot image 51C.

Performing the foregoing process makes it possible to change crash probable regions with reference to the direction and speed of movement of an unmanned air vehicle in a process for changing crash probable regions, thus making it possible to determine a crash probable region more appropriately and lower the possibility of the unmanned air vehicle crashing on a person.

It should be noted that although a region obtained by translating a crash probable region centered at the point that is directly below the unmanned air vehicle 1C from the point that is directly below the unmanned air vehicle 1C to the predicted point of falling is determined as a translated crash probable region in the process of step S107, another configuration may be employed, provided such a configuration is one in which a translated crash probable region is determined with reference to the speed and direction of movement of the unmanned air vehicle 1C.

It should be noted that although Embodiment 3 describes a configuration in which a translated crash probable region is determined with reference to the speed and direction of movement of the unmanned air vehicle 1C, a translated crash probable region may be determined only with reference to the speed and direction of movement of the unmanned air vehicle 1C without reference to the altitude or wind speed measured by the unmanned air vehicle 1C. For example, in a case where the unmanned air vehicle 1C flies at a predetermined altitude or in case where the unmanned air vehicle 1C flies in an environment where the unmanned air vehicle 1C is hardly affected by the wind speed, it is not always necessary to change translated crash probable regions according to the altitude of the unmanned air vehicle 1C or the speed of the wind around the unmanned air vehicle 1C. In this case, it is only necessary to determine a translated crash probable region only with reference to the speed and direction of movement of the unmanned air vehicle 1C.

It should be noted that Embodiment 3 describes a configuration in which a translated crash probable region is determined with reference to the speed and direction of movement of the unmanned air vehicle 1C, a translated crash probable region may be similarly determined according to the speed and direction of the wind around the unmanned air vehicle 1C. In the case of this configuration, the speed of the wind around the unmanned air vehicle 1C corresponds to the speed of movement of the unmanned air vehicle 1C in Embodiment 3, and the direction of the wind around the unmanned air vehicle 1C corresponds to the direction of movement of the unmanned air vehicle 1C in Embodiment 3. This configuration makes it possible to determine a translated crash probable region with reference to the speed and direction of the wind around the unmanned air vehicle 1C, thus making it possible to determine a translated crash probable region more appropriately and lower the possibility of the unmanned air vehicle 1C crashing on a person.

Other Embodiments

As above, Embodiments 1 to 3 have been described as examples of the technology of the present disclosure. However, the technology in the present disclosure is not limited to this, but can be applied to embodiments with change, substitution, addition, omission, or the like. Further, the constituent elements described in Embodiments 1 to 3 may be combined to constitute a new embodiment.

In the foregoing, an unmanned air vehicle and a method for controlling flight of an unmanned air vehicle according to one or more aspects of the present disclosure have been described with reference to embodiments. However, the present disclosure is not limited to these embodiments. Applications of various modifications conceived of by persons skilled in the art to the embodiments and embodiments based on combinations of constituent elements in different embodiments may be encompassed in the scope of one or more aspects of the present disclosure, provided such applications and embodiments do not depart from the spirit of the present disclosure.

It should be noted that, in each of the embodiments described above, each constituent element may be constituted by dedicated hardware or may be achieved by executing a software program suited to that constituent element. Each constituent element may be achieved by a program executer such as a CPU or a processor reading out and executing a software program stored in a storage medium such as a hard disk or a semiconductor memory.

Some or all of the functions of the unmanned air vehicles according to Embodiments 1 to 3 of the present disclosure are typically achieved as integrated circuits by LSI (large-scale integration). These circuits may each be in the form of separate chips or may be in the form of a single chip including some or all of them. Further, the integration of circuits may be achieved by dedicated circuits or general-purpose processors as well as LSI. An FPGA (field programmable gate array), which can be programmed after LSI manufacturing, or a reconfigurable processor, in which the connections and settings of circuit cells inside the LSI can be reconfigured, may be used.

Further, some or all of the functions of the unmanned air vehicles according to Embodiments 1 to 3 of the present disclosure may be achieved by a processor such as a CPU executing a program.

Further, the numbers used above are all taken as examples to specifically describe the present disclosure, and the present disclosure is not limited to the numbers taken as examples.

Further, in each of the flow charts shown in FIGS. 7, 8, 13, 15, 16, 20, and 21, the order in which the steps are executed is taken as an example to specifically describe the present disclosure, and the steps may be executed in another order, provided similar advantageous effects are brought about. Further, some of the steps may be executed at the same time (in parallel with) other steps.

Furthermore, various modifications obtained by applying changes as conceived of by persons skilled in the art to the embodiments of the present disclosure are also encompassed in the present disclosure, provided such modifications do not depart from the spirit of the present disclosure.

An unmanned air vehicle and a flight control method according to the present disclosure make it possible to prevent an unmanned air vehicle from falling onto an object of avoidance and to fly an unmanned air vehicle efficiently, and as such, are useful as an unmanned air vehicle that flies without having a person inside it and a method for controlling flight of such an unmanned air vehicle.

What is claimed is:

1. An unmanned air vehicle comprising:
 a camera that takes an image in a vertical direction from the unmanned air vehicle; and
 circuitry which, in operation:
  determines, based on the image, a crash probable region in which the unmanned air vehicle is likely to crash due to an unforeseen circumstance, in an event of the unforeseen circumstance occurring, the crash probable region being determined based on an altitude of the unmanned air vehicle, the crash probable region decreasing in size when the altitude decreases;
  detects an object of avoidance that is present in the crash probable region;
  in a case where the object of avoidance is detected, controls flight of the unmanned air vehicle to decrease the altitude of the unmanned air vehicle so that the object of avoidance becomes undetectable in the crash probable region; and
  changes the crash probable region according to a result of the flight control.

2. The unmanned air vehicle according to claim 1, further comprising an altitude sensor that measures the altitude of the unmanned air vehicle.

3. The unmanned air vehicle according to claim 2, wherein the circuitry makes the crash probable region narrower as the altitude of the unmanned air vehicle is lower.

4. The unmanned air vehicle according to claim 2, wherein the circuitry further detects at least one object of avoidance that is present outside of the crash probable region,
 in a case where a number of objects of avoidance that are present outside of the crash probable region is larger than a predetermined number, the circuitry controls the flight of the unmanned air vehicle to lower the altitude of the unmanned air vehicle, and
 the circuitry makes the crash probable region narrower as the altitude of the unmanned air vehicle becomes lower.

5. The unmanned air vehicle according to claim 1, further comprising a wind speed sensor that measures a speed of a wind around the unmanned air vehicle,
 wherein the circuitry controls the flight of the unmanned air vehicle according to the speed of the wind.

6. The unmanned air vehicle according to claim 5, further comprising a wind direction sensor that measures a direction of the wind around the unmanned air vehicle,
 wherein the circuitry controls the flight of the unmanned air vehicle according to the direction of the wind and the speed of the wind.

7. The unmanned air vehicle according to claim 1, further comprising:
 a speed sensor that measures a flight speed of the unmanned air vehicle;
 a position measurer that measures a current position of the unmanned air vehicle; and
 an azimuth sensor that measures an azimuth of the current position of the unmanned air vehicle, wherein the circuitry controls the flight of unmanned air vehicle according to the flight speed, the current position, and the azimuth.

8. The unmanned air vehicle according to claim 1, wherein
the circuitry further detects whether a second object is present in the crash probable region, the second object satisfying a preset condition, and
in a case where the second object is detected in the crash probable region, the circuitry does not control the flight of the unmanned air vehicle.

9. The unmanned air vehicle according to claim 1, further comprising a communicator that communicates with a terminal that controls the unmanned air vehicle,
wherein in the case where the object of avoidance is detected, the communicator inquires of the terminal whether to control the flight of the unmanned air vehicle, and
the circuitry controls the flight of the unmanned air vehicle in response to receiving a confirmation of the inquiry.

10. The unmanned air vehicle according to claim 1, wherein the circuitry superimposes the crash probable region in which the unmanned air vehicle is likely to crash on the image.

11. The unmanned air vehicle according to claim 1, wherein the circuitry determines the crash probable region in which the unmanned air vehicle is likely to crash by accounting for a sudden failure of the unmanned air vehicle.

12. An unmanned air vehicle, comprising:
a camera that takes an image in a vertical direction from the unmanned air vehicle; and
circuitry which, in operation:
determines, based on the image, a crash probable region in which the unmanned air vehicle is likely to crash due to an unforeseen circumstance, in an event of the unforeseen circumstance occurring, the crash probable region being determined based on an altitude of the unmanned air vehicle, the crash probable region decreasing in size when the altitude decreases;
detects an object of avoidance that is present in the crash probable region;
in a case where the object of avoidance is detected, controls flight of the unmanned air vehicle to decrease the altitude of the unmanned air vehicle so that the object of avoidance becomes undetectable in the crash probable region; and
changes the crash probable region according to a result of the flight control,
wherein the circuitry controls the flight of the unmanned air vehicle by dividing the image into a plurality of crash probable regions and causing the unmanned air vehicle to fly in a direction of one of the plurality of crash probable regions having a least number of objects of avoidance.

13. The unmanned air vehicle according to claim 1, wherein, in the case where the object of avoidance is detected, the circuitry temporarily invalidates control instructions from a remote controller.

14. A method for controlling flight of an unmanned air vehicle, the method comprising:
taking, by a camera, an image in a vertical direction from the unmanned air vehicle;
determining, based on the image and by a processor, a crash probable region in which the unmanned air vehicle is likely to crash due to an unforeseen circumstance, in an event of the unforeseen circumstance occurring, the crash probable region being determined based on an altitude of the unmanned air vehicle, the crash probable region decreasing in size when the altitude decreases;
detecting, by the processor, an object of avoidance that is present in the crash probable region;
in a case where the object of avoidance is detected, controlling at least one of a motor or a propeller of the unmanned air vehicle to decrease the altitude of the unmanned air vehicle so that the object of avoidance becomes undetectable in the crash probable region; and
changing the crash probable region according to a result of the controlling of the at least one of the motor or the propeller.

15. The unmanned air vehicle according to claim 1, wherein the circuitry, in operation, repeatedly performs processes during flight operation of the unmanned air vehicle, the processes including at least determining whether the object of avoidance is present in the crash probable region and changing the crash probable region.

16. The unmanned air vehicle according to claim 15, wherein, in the processes which are repeatedly performed, the crash probable region is changed whether or not the object of avoidance is present in the crash probable region.

17. The unmanned air vehicle according to claim 16, wherein the circuitry, in operation, repeatedly performs the processes from a first point in time where the unmanned air vehicle takes-off to a second point in time where the unmanned air vehicle lands.

18. The unmanned air vehicle according to claim 16, wherein the circuitry, in operation, repeatedly performs the processes in parallel with a flight control process of the unmanned air vehicle.

19. The unmanned air vehicle according to claim 18, wherein the flight control process is performed in accordance with flight control instructions from a remote controller.

20. The unmanned air vehicle according to claim 1, wherein the circuitry detects the object of avoidance that is present in the crash probable region, controls the flight of the unmanned air vehicle to decrease the altitude, and changes the crash probable region according to the result of the flight control without any unforeseen circumstance being present.

* * * * *